(12) United States Patent
Mueck et al.

(10) Patent No.: US 8,483,392 B2
(45) Date of Patent: Jul. 9, 2013

(54) METHODS AND APPARATUS FOR COMPENSATION FOR CORRUPTED USER IDENTIFICATION DATA IN WIRELESS NETWORKS

(75) Inventors: Markus Mueck, Unterhaching (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 12/567,412

(22) Filed: Sep. 25, 2009

(65) Prior Publication Data

US 2011/0078453 A1   Mar. 31, 2011

(51) Int. Cl.
*H04L 9/00* (2006.01)

(52) U.S. Cl.
USPC .................................................. 380/277

(58) Field of Classification Search
USPC .................. 380/267, 270, 277, 286
See application file for complete search history.

(56) References Cited

U.S. PATENT DOCUMENTS

| 5,414,734 | A | 5/1995 | Marchetto et al. | |
|---|---|---|---|---|
| 7,545,317 | B2 * | 6/2009 | Han | 342/357.64 |
| 7,701,391 | B2 * | 4/2010 | Curry et al. | 342/357.42 |
| 2003/0125002 | A1 | 7/2003 | Harrison | |
| 2005/0114214 | A1 | 5/2005 | Itoh | |
| 2007/0177729 | A1 * | 8/2007 | Reznik et al. | 380/44 |
| 2008/0075280 | A1 | 3/2008 | Ye et al. | |
| 2010/0057485 | A1 | 3/2010 | Luft | |
| 2011/0076991 | A1 | 3/2011 | Mueck | |

FOREIGN PATENT DOCUMENTS

WO    WO 97/49213    12/1997

OTHER PUBLICATIONS

3GPP TS 36.331 V8.2.0 (May 2008); $3_{rd}$ Generation Partnership Project; Technical Specification Group Radio Access Network; Evolved Universal Terrestrial Radio Access (E-UTRA); Radio Resource Control (RRC); Protocol specification (Release 8).
A Scheme of Private Key Agreement Based on the Channel Characteristics in OFDM Land Mobile Radio by A. Kitaura and H. Sasaoka, Electronics and Communications in Japan, Part 3, vol. 88, No. 9, 2005, XP-001229821, 10 pages.
Adaptive Key Generation in Secret Key Agreement Scheme based on the Channel Characteristics in OFDM by S. Yasukawa, H. Iwai, and H. Sasaoka, Int'l Symposium on Information Theory and its Applications, ISITA Dec. 2008, XP-31451272A, 6 pages.

* cited by examiner

*Primary Examiner* — Beemnet Dada
(74) *Attorney, Agent, or Firm* — Gazdzinski & Associates, PC

(57) ABSTRACT

Methods and apparatus that correct for corrupted user identification or other data based on reciprocal transmission channel characteristic. In one embodiment, a level of tolerance is disclosed which provides a degree of leniency in user identification. In alternate embodiments, a level of tolerance is disclosed which provides a narrow window for "guessing" of user identification. Various methods for quantization and specification of tolerances are also disclosed. Methods and apparatus useful for implementing variation-tolerant encryption schemes are also provided.

49 Claims, 17 Drawing Sheets

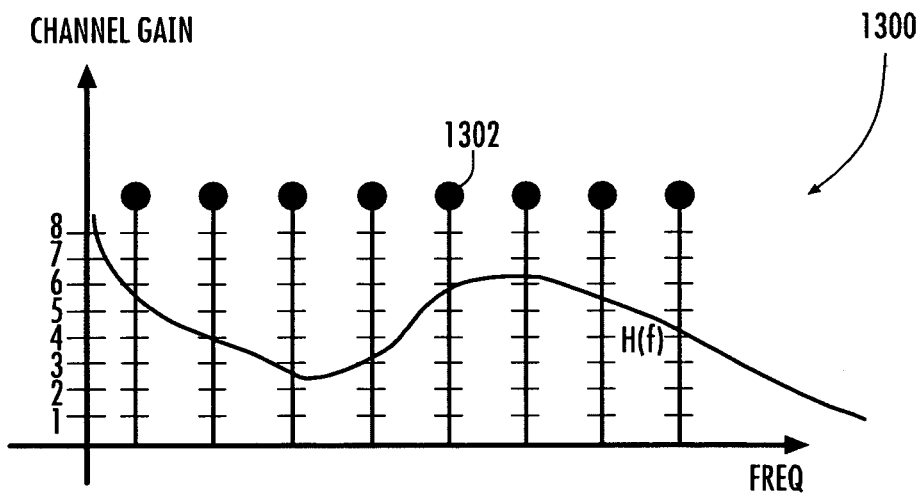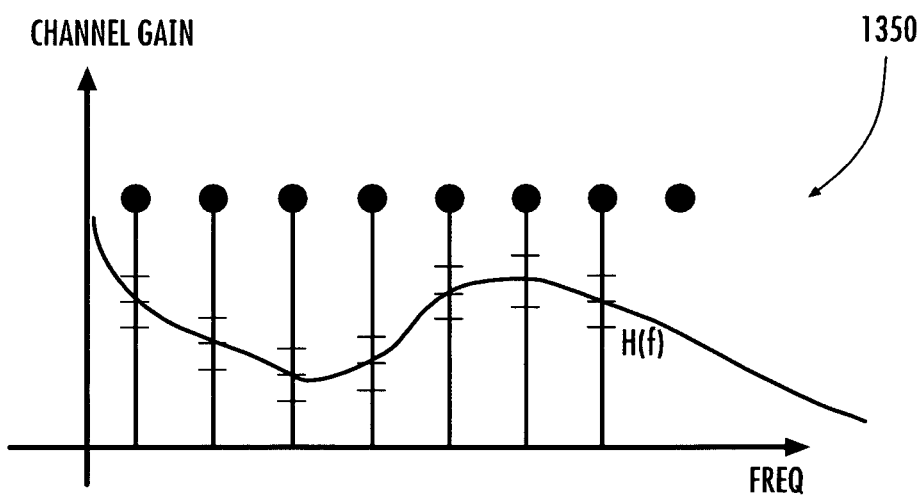
FIG. 13

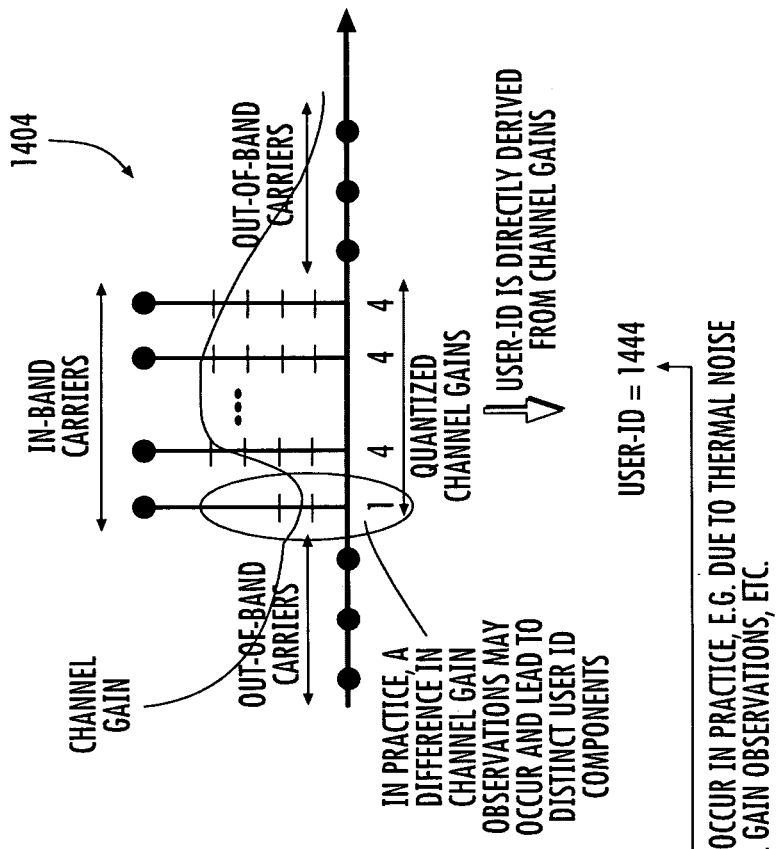
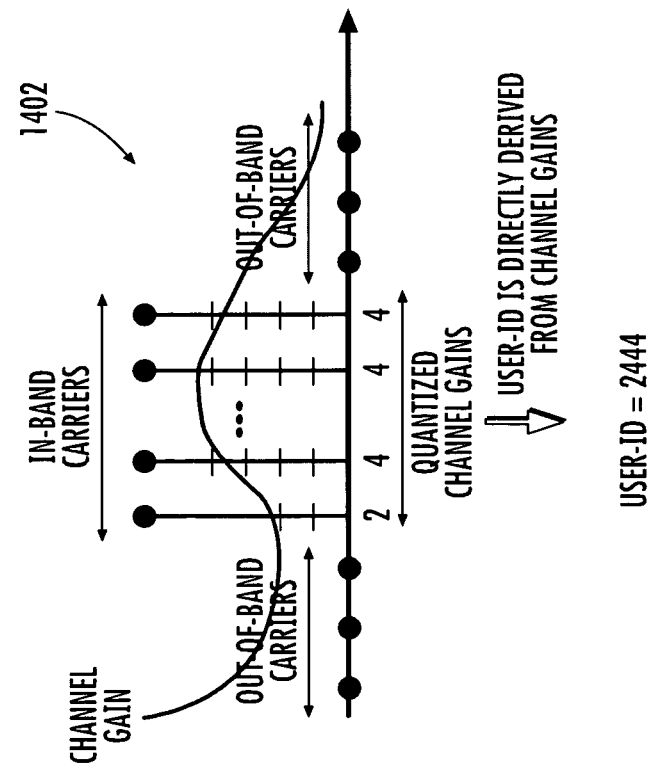
FIG. 14

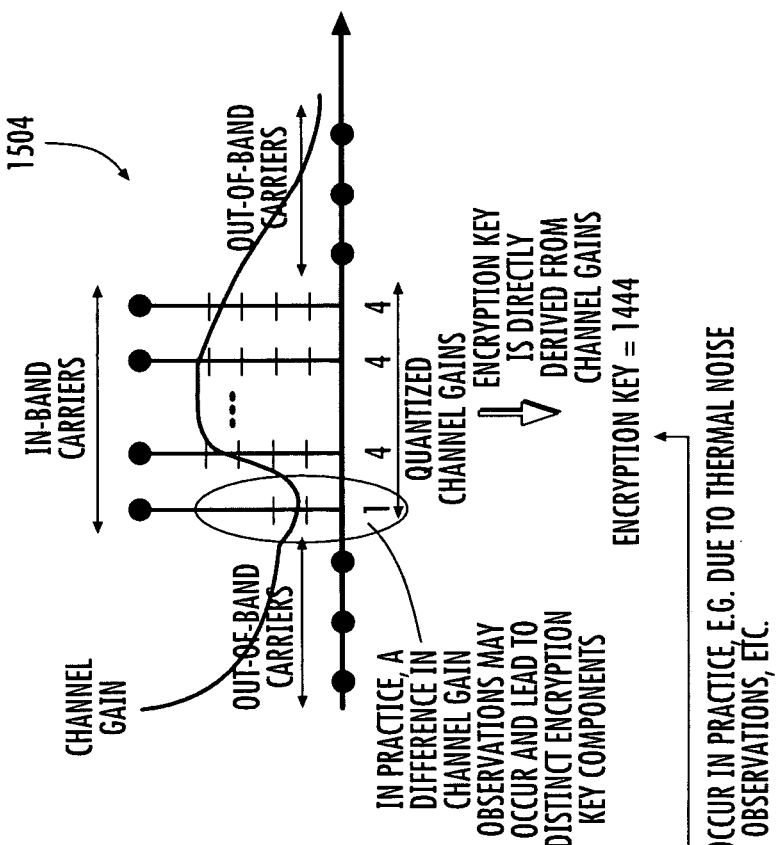
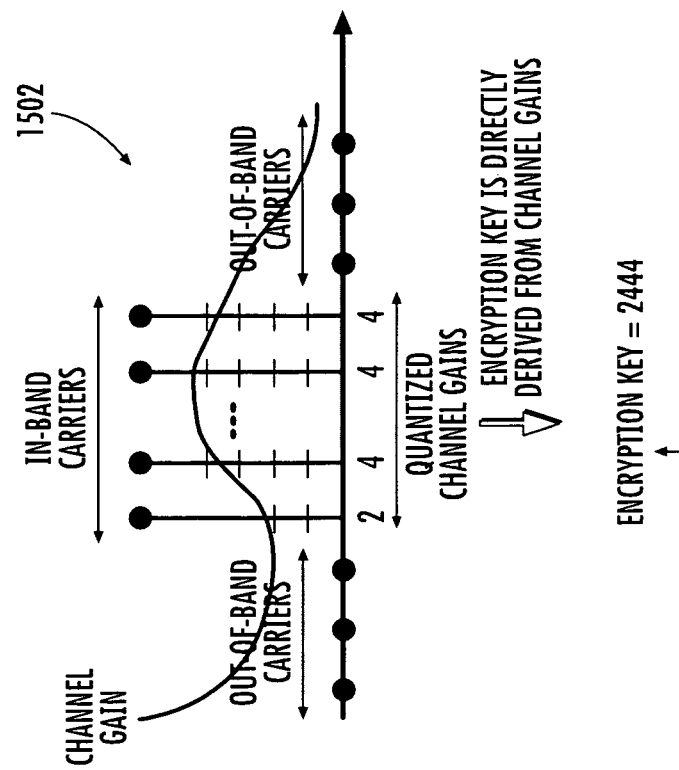
FIG. 15

METHODS AND APPARATUS FOR COMPENSATION FOR CORRUPTED USER IDENTIFICATION DATA IN WIRELESS NETWORKS

RELATED APPLICATIONS

This application is related to co-owned and co-pending U.S. patent application Ser. No. 12/567,327 entitled "METHODS AND APPARATUS FOR DYNAMIC IDENTIFICATION (ID) ASSIGNMENT IN WIRELESS NETWORKS" filed Sep. 25, 2009 (contemporaneously herewith), which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks and more particularly, in one exemplary aspect, to the implementation of user access and identification error compensation techniques in such networks.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

Many current developments in wireless network technologies are directed to combining the connectivity associated with various wireless technologies (such as Wi-Fi, WiMAX, and cellular). Such envisioned heterogeneous networks may enable a user to instantly establish an "ad hoc" wireless network connection to another peer device, base station (e.g., macrocell, microcell, femtocell, picocell, etc.), access point, etc. A new class of "subscription-less" data services has emerged from this framework of steadily converging wireless technologies.

Subscription-Less Data Services

Current proposals for subscription-less data services seek to minimize the complexity of traditional network management overhead. For example, some subscription-less data services will not require registration at the network or service level prior to the initiation of communication. Subscription-less data services are targeted for instant and/or transient types of communication sessions; in some cases, subscription-less services are envisioned for the provision of anonymous services (e.g., data service regardless of user identity). Subscription-less data services may be useful in a wide variety of scenarios. For example, any wireless network host may provide disposable media such as e.g., advertisements, broadcasts, multicasts, user incentives, etc. Wandering users can consume such services without any long-term commitments (e.g., contracts, or fees, etc.).

Existing user access schemes provide secure user identification at the cost of significant messaging overhead, and some limited vulnerability. For example, UMTS cellular network access control is based on an authentication protocol called Authentication and Key Agreement (AKA). AKA is a challenge-response based mechanism that uses symmetric key cryptography. In the UMTS implementation of AKA, the user equipment (UE) must first identify itself before the Core Network can initiate the challenge-response; the Core Network will then initiate a challenge process to the UMTS Subscriber Identity Module (USIM), which is preprogrammed with the AKA response protocol. AKA does not tolerate differences between returned and expected responses.

Unfortunately, the complexity and security aspects of extant access control methods are in general poorly matched to the requirements of the aforementioned subscription-less data services. Accordingly, improved methods and apparatus are needed for user identification in simple or ad hoc networking systems. Furthermore, such improved solutions should ideally minimize user identification and or registration traffic between wireless networking entities for simple or ad hoc networks. Concurrently, suitable solutions should continue to guarantee adequate amounts of user privacy protection, and "uniqueness".

Ideally, such methods and apparatus should compensate for differences between returned and expected authentication responses. Differences between returned and expected authentication responses may be caused by any number of confounding variables, including channel corruption, radio environment, etc. While an ideal system should allow errors due to these relatively innocuous "environmental" effects, the degree of security offered by such a system must still defeat common malicious attacks.

SUMMARY OF THE INVENTION

The present invention satisfies the foregoing needs by providing, inter alia, improved methods and apparatus for signature and encryption key generation.

In a first aspect of the invention, a method of compensating for differences between an unknown data element and a detected data element are described. In one embodiment, the data element includes an encryption key, and the method includes: detecting an encryption key; determining a level of tolerance; decrypting a data transmission using the detected encryption key; and if the decrypted data transmission is not successful: modifying the detected key within the level of tolerance; and decrypting the data transmission using the modified detected key.

In one variant, the detected encryption key is based at least in part on one or more radio channel characteristics (e.g., CIR), which may also be quantized according to e.g., a fixed or variable degree. The CIR may be e.g., a time or frequency domain representation of received signal magnitude.

In another variant, the detected encryption key is based at least in part on one or more detection parameters.

The detection parameters can be broadcast or otherwise transmitted, and/or may be predefined.

In yet another variant, the level of tolerance is based at least in part on one or more estimations of noise; e.g., signal-to-noise ratio (SNR) determinations. In one such implementation, the level of tolerance is inversely proportional to the signal-to-noise ratio (SNR).

Alternatively, the level of tolerance is based at least in part on one or more estimations of noise, the one or more estimations of noise comprising a summation of one or more values, the one or more values derived from the channel impulse response; e.g., wherein the level of tolerance is inversely proportional to the summation of one or more values.

In another variant, the modifying includes incrementing or decrementing one or more values of the detected key within the level of tolerance.

In still another variant, the steps of modifying the detected key within the level of tolerance and decrypting the data transmission using the modified detected key are repeated until the decrypted data transmission is successful.

In a second aspect of the invention, a wireless apparatus is disclosed. In one embodiment, the apparatus is adapted to compensate for differences between two signatures, and includes: a first module configured to detect a first signature; a second module configured to determine a level of tolerance; a third module configured to receive a data transmission associated with a known second signature; a processing device in data communication with a memory; and a plurality of executable instructions resident within the memory. When executed by the processing device, the instructions: compare the detected first signature to the known second signature; and if the difference between the detected first signature and known second signature is within the level of tolerance, decode the data transmission.

In one variant, the detected first signature is based at least in part on one or more radio channel characteristics (e.g., CIR). In another variant, the detected first signature is based at least in part on one or more detection parameters.

In a further variant, the first module is additionally configured to quantize the detected first signature; e.g., according to a fixed or configurable degree of quantization. For example, the quantized radio channel characteristic may be one or more signal magnitudes, time values, frequency values, and/or phase values.

In yet another variant, the channel impulse response (CIR) is a time or frequency domain representation of received signal magnitude.

In still another variant, the level of tolerance includes a range of values; e.g., with a maximum value and/or a minimum value.

In another variant, the detected first signature and second known signature comprise corresponding arrays of values; and the level of tolerance includes a number, the number indicating a maximum allowable number of missing values between the first and second signatures.

In a third aspect of the invention, a method of deriving and using a signature in a wireless network is disclosed. In one embodiment, the signature is used for providing a data service, and the method includes: receiving a request for a data service; deriving a signature from one or more channel characteristics of the request, where the deriving is performed without any supporting message exchange; and providing the data service, the data service being identified with the signature.

In one variant, the derived signature includes an array of values, the values representing a channel impulse response. The channel impulse response includes at least one dimension selected from the group consisting of: (i) amplitude, (ii) time, (iii) frequency, (iv) phase, (v) time difference, and (vi) phase difference.

In another variant, the channel impulse response includes a first dimension selected from the group consisting of time and frequency, and a second dimension selected from the group consisting of amplitude and phase.

In yet another variant, the method further includes transmitting a broadcast identifying one or more parameters, the one or more parameters useful for deriving the signature. The broadcast is for example a System Information Block (SIB), or a Master Information Block (MIB).

In a fourth aspect of the invention, a wireless apparatus adapted to compensate for differences between two values is disclosed. In one embodiment, the values are encryption keys, at least one of which is not known, and the wireless apparatus includes: a first module configured to detect a first encryption key; a second module configured to determine a level of tolerance; a third module configured to receive a data transmission associated with an unknown second encryption key; a processing device in data communication with a memory; and a plurality of executable instructions resident within the memory. When executed by the processing device, the instructions: decrypt the data transmission using the detected first encryption key; and if the decrypted data transmission is not successful: modify the detected first encryption key within the level of tolerance; and decrypt the data transmission using the modified detected first encryption key.

In one variant, the wireless apparatus is a mobile user device adapted for communication with a WLAN network.

In another variant, the wireless apparatus is a base station or access point (AP).

In a fifth aspect of the invention, a wireless system configured for correction of corrupted or variant user identification (ID) data is disclosed. In one embodiment, the system is a cellular system having a plurality of base stations and a plurality of mobile devices.

In a sixth aspect of the invention, a computer readable apparatus is disclosed. In one embodiment, the apparatus includes a computer readable medium having a computer program stored thereon, the program being configured to perform correction of corrupted or variant user ID data.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 13 is a graphical illustration of relative and absolute quantization schemes useful with the present invention.

FIG. 14 is a graphical illustration of the relationship between the transmitter's user identity and the receiver's user identity, and the disparity between the two identities.

FIG. 15 is a graphical illustration of the relationship between the transmitter's encryption key and the receiver's encryption key, and the disparity between the two encryption keys.

DETAILED DESCRIPTION OF THE INVENTION

Figure 1:
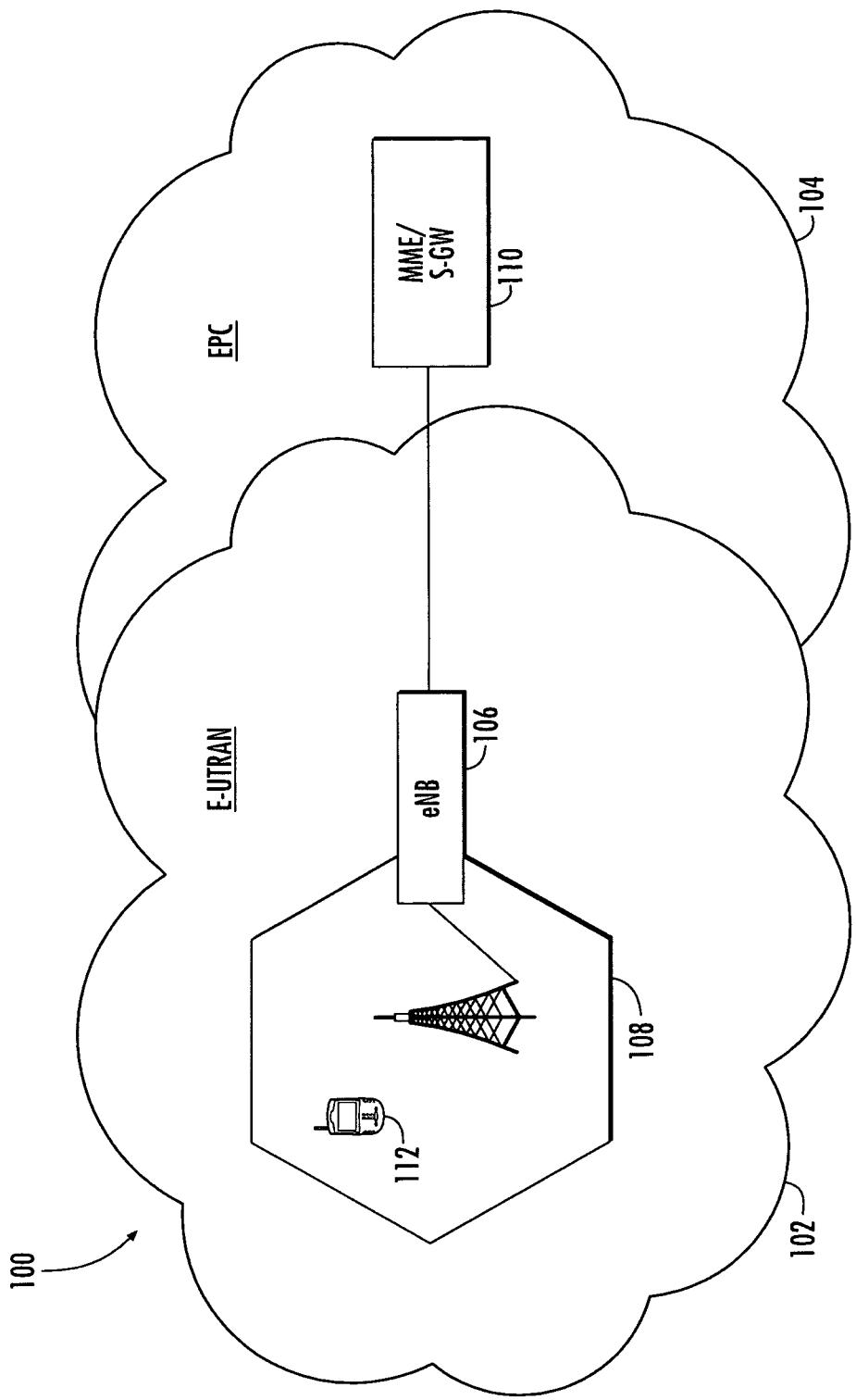
FIG. 1 is a graphical illustration of one embodiment of a prior art LTE network according to the invention comprising an Evolved Packet Core (EPC), and an Evolved UMTS Terrestrial Radio Access Network (E-UTRAN).

Reference is now made to the drawings, wherein like numerals refer to like parts throughout.
Overview The present invention provides, inter alia, methods and apparatus that enable a first wireless device to identify a second wireless device based on one or more transmission channel characteristics, such as a multipath signature. In one exemplary aspect, a "pseudonym" related to the transmission path characteristic(s) is generated and interpreted with a degree of leniency or tolerance.

The first device and the second device derive a user identity, encryption key, etc. based on their shared forward and reverse channel characteristics. In one exemplary variant, the shared secret (e.g., identity, key) is comprised of a representation of the channel impulse response in one or more dimensions (amplitude, time, frequency, phase, spatial arrangement, etc.). The first and second devices can utilize a common method for identifying the shared secret from the channel characteristics. Optimization information may also broadcast from the second device to ensure a common scheme with the first device.

In one exemplary embodiment, the first device derives a characteristic channel-based secret, and a level of tolerance. For example, the first device determines if its secret is within the level of tolerance of the second device's secret and if so, establishes the secret as valid. Alternatively, the first device may be configured to "guess" the second device's secret based on its derived secret, and a level of tolerance. The methods and apparatus of the invention effectively eliminate the transmission of sensitive user information on vulnerable "over the air" (OTA) channels, as well as provide user security and privacy for subscription-less data services. These methods and apparatus also help protect against common malicious attacks (e.g., man-in-the-middle, spoofing, denial of service, etc.) by virtue of the unique and substantially transient "signature" created by the wireless channel existing between two participating devices.

Detailed Description of Exemplary Embodiments

Exemplary embodiments of the present invention are now described in detail. In one embodiment, the techniques of the present invention are applied to the methods and apparatus set forth in co-owned and co-pending U.S. patent application Ser. No. 12/567,327 entitled "METHODS AND APPARATUS FOR DYNAMIC IDENTIFICATION (ID) ASSIGNMENT IN WIRELESS NETWORKS" filed concurrently herewith, previously incorporated by reference in its entirety, which discloses a channel characteristic (e.g., CIR) based user access scheme. The CIR based user ID scheme combines the unpredictable properties of multipath over-the-air (OTA) channels to provide subscription-less (and even anonymous) data services.

While the following exemplary embodiments are primarily discussed in the context of the aforementioned channel characteristic-based access control for the provisioning of subscription-less data services, it will be appreciated by those of ordinary skill that the present invention is not limited to such a scheme, or such data services. Yet other applications (including those which are not based on wireless channel characteristics) will be recognized by those of ordinary skill given the present disclosure. See, e.g., United States Patent Application Publication No. 20080075280 to Ye Chunxuan, et al. filed Mar. 27, 2008 and entitled "GROUP-WISE SECRET KEY GENERATION", incorporated herein by reference in its entirety, which discloses a method for constructing a secret key within a group of nodes. In a group of m nodes, pair-wise secret keys are assigned. Based on pair-wise secret keys, these m nodes generate a group-wise secret key. In one embodiment, each node communicates with every other node through public noiseless broadcasts.

While the foregoing scheme of United States Patent Application publication No. 20080075280 utilizes channel estimation to determine an encryption key, subtle differences in the encryption key derivation are disastrous (e.g., due to minor changes in channel estimates). Such encryption schemes cannot tolerate minor differences in the encryption keys. Thus, in at least one aspect of the present invention, solutions are advantageously provided to produce adequate levels of tolerance useful for such encryption schemes based on unpredictable or random parameters. In various embodiments, variations in channel characteristics are mitigated, so as to facilitate encryption key generation that would otherwise not be possible under the prior art.

In one exemplary embodiment of the present invention, a channel based encryption key only requires a reasonable degree of accuracy to coincide with the decryption key (e.g., a percentage of matching decryption key digits). For example, if a packet is transmitted with a given m-digit encryption key, the receiver can recover the target device packet if its derived decryption key corresponds to the transmitted m-digits within a degree of tolerance (e.g., if less than all of the digits but greater than a threshold percentage coincide with the encryption key).

Throughout the following discussions, the term "pseudonym", "encryption key", and "signature", and "user ID", specifically refer to a CIR-based signature or key. Discussions are presented for both encryption keys and user identities which are derived from unpredictable radio characteristics. As discussed in greater detail herein, encryption keys are "guessed" within a range of tolerance, whereas user IDs are "compared" within a range of tolerance.

Exemplary Cellular Architectures—

FIG. 1 illustrates one exemplary prior art high-level LTE cellular radio system 100 comprising the E-UTRAN (Evolved UMTS Terrestrial Radio Access Network) 102 and the Core Network EPC (Evolved Packet Core) 104. The E-UTRAN consists of a number of base stations (such as eNodeBs (eNBs)) 106. Each base station provides radio coverage for one or more mobile radio cells 108 within the E-UTRAN. In LTE, each eNB is connected to the EPC via a S1 interface. The eNBs directly connect to two EPC entities, the MME (Mobility Management Entity) and the Serving Gateway (S-GW) 110. The MME is responsible for controlling the mobility of UEs 112 located in the coverage area of the E-UTRAN. The S-GW handles the transmission of user data between the UE and the network.

Prior Art Access Control

Figure 2:
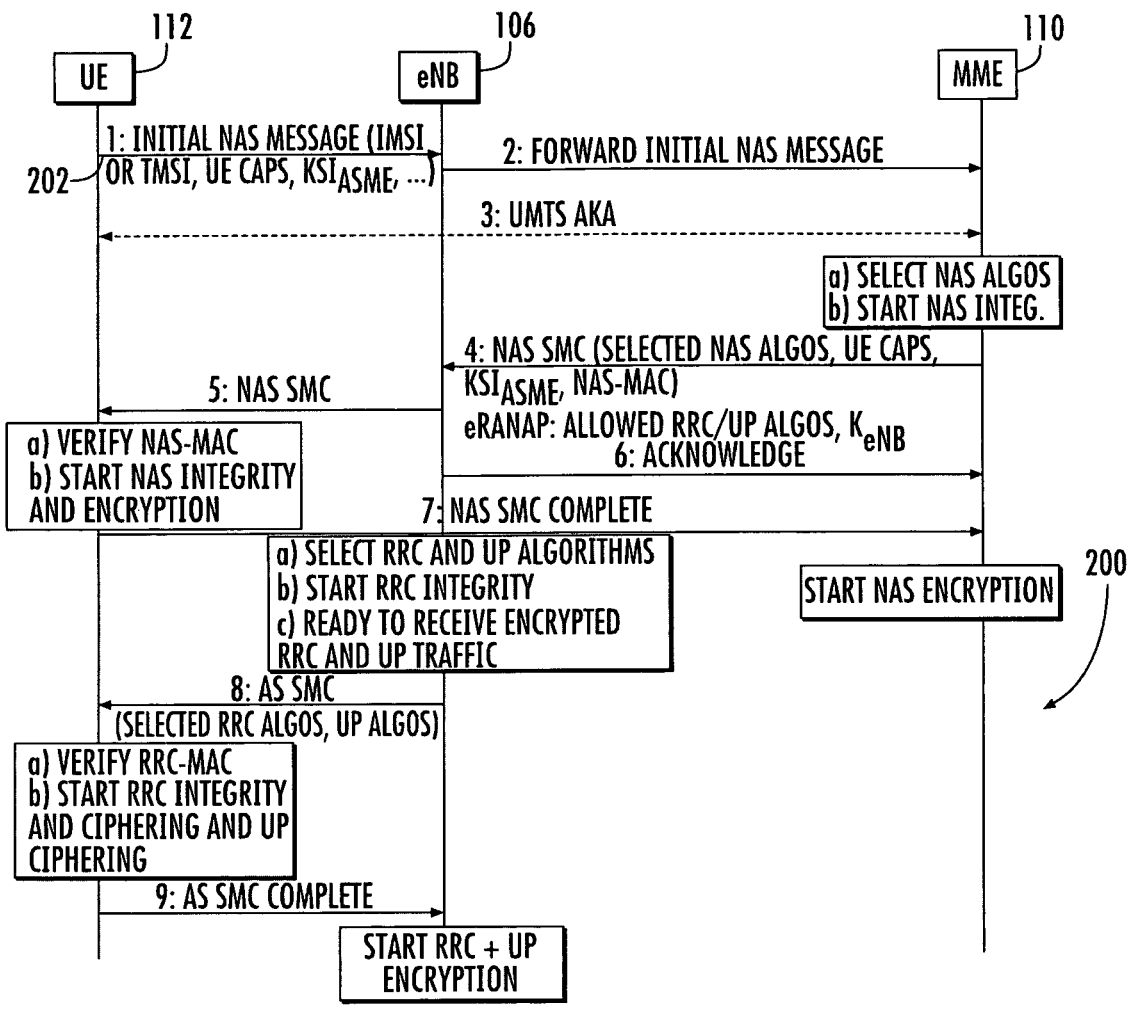
FIG. 2 is a graphical illustration of a typical prior art UMTS authentication and security setup procedure.

FIG. 2 illustrates the prior art access control scheme 200 for the exemplary 3G cellular networks. Access control has been based on an authentication protocol called Authentication and Key Agreement (AKA). AKA is a challenge-response based mechanism that uses symmetric key cryptography. In the UMTS implementation of AKA, the user equipment (UE) must first identify itself before the Core Network can initiate the challenge-response; the Core Network will then initiate a challenge process to the UMTS Subscriber Identity Module (USIM), which is preprogrammed with the AKA response protocol.

The USIM is resident to the UE 112, and it includes the hardware and software apparatus required to unambiguously and securely identify the user to the network. The USIM typically resides on a smart card that can be inserted or removed from the mobile device and contains, inter alia, the permanent identity of the user, called the International Mobile Subscriber Identity (IMSI), and a shared secret key (used for authentication). The smart card is generally referred to as the UMTS Integrated Circuit Card (UICC). The USIM on the UICC card is provided by the service provider; hence even if the UICC card is moved from one UE to another, the service provider and service configuration remain the same. The importance of the IMSI identification to user privacy imposes specific protection measures, such that the subscriber identity is masked whenever possible.

The IMSI consists of Mobile Country Code (MCC), a Mobile Network Code (MNC), and a Mobile Subscriber Identification Number (MSIN). The total maximum length of IMSI is fifteen (15) digits, where the MCC is three (3) digits and MNC is typically two or three (2 or 3) digits depending on the area. From a subscriber's privacy point of view, the MSIN uniquely identifies the subscriber, and thus must be protected for confidentiality reasons. Unfortunately, the subscriber's credentials cannot be fetched before the subscriber has been properly identified. Thus, with the 3G AKA authentication method the network cannot be authenticated (from the UE's point of view) before the UE has provided its own identification (202). Furthermore, because the UE must transmit its IMSI across the air interface, the UE must be able to recognize and reject plain text IMSI queries coming from an untrustworthy source. Additionally, public key cryptography or symmetric keys may be used to hide the IMSI.

The IMSI is sent as rarely as possible, to avoid being identified and tracked. The IMSI is only used when the mobile has just been switched on, or when the data in the mobile becomes invalid for one reason or another (e.g., superseded or expired). Otherwise, the network provides a Temporary Mobile Subscriber Identification (TMSI) for user identification. The TMSI is a randomly allocated number that is only valid within a given local geographic area. The network frequently changes the TMSI at arbitrary intervals in order to avoid the subscriber from being identified and tracked by eavesdroppers on the radio interface. While TMSI provides additional privacy to a user, the TMSI may only be granted after the IMSI has initially passed the AKA correctly. Therefore, even though the TMSI can minimize IMSI exposure after AKA, since the IMSI is the unique identifier for the UE, it is vulnerable during the initial AKA.

Subscription-Less Access—

Figure 3:
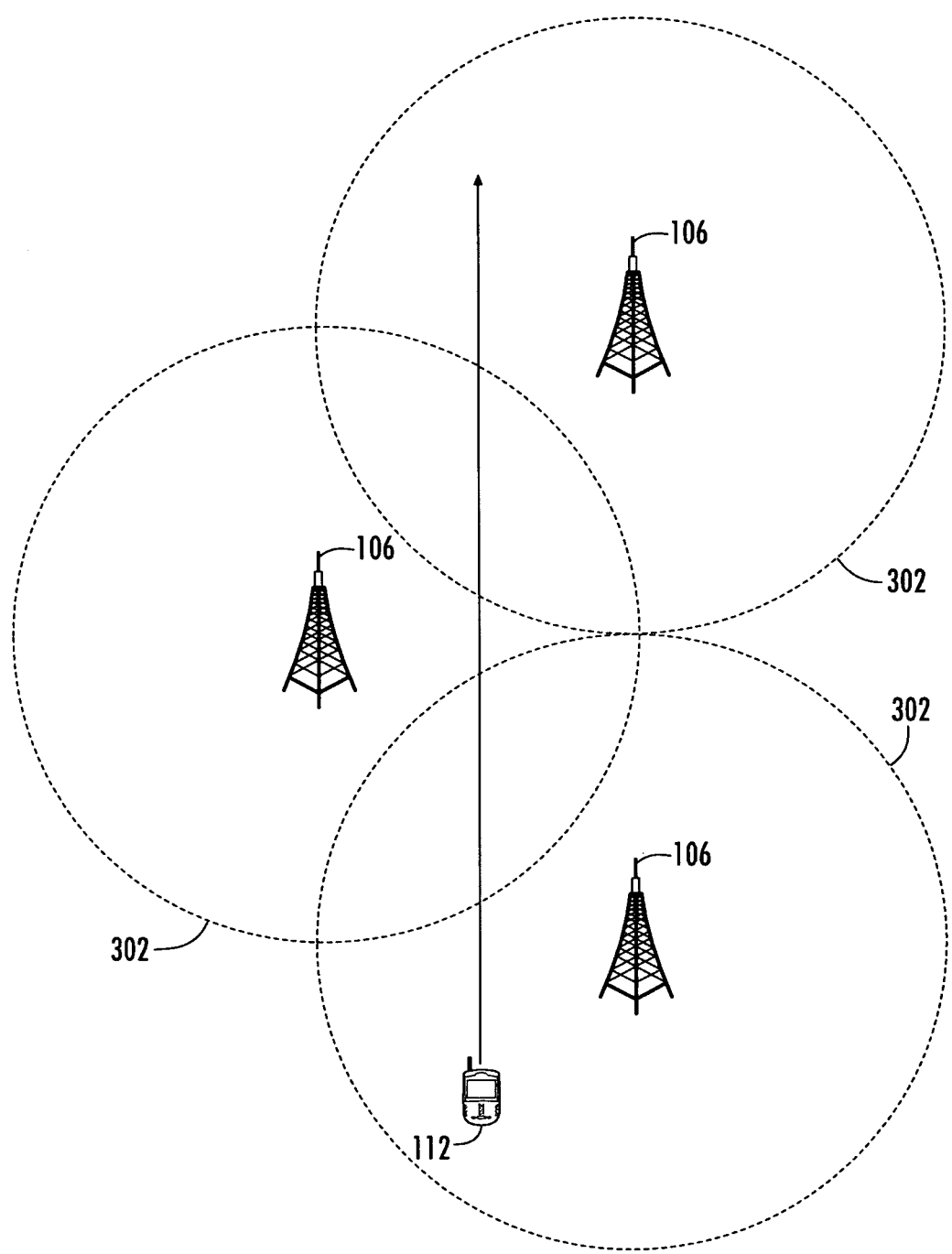
FIG. 3 is a graphical illustration of a user device travelling through several subscription-less access coverage areas.

Unlike typical cellular access (as described above), subscription-less access is characterized by substantially less permanent and/or anonymous data transmissions. Referring now to FIG. 3, a UE 112 is shown travelling through several subscription-less access coverage areas 302 (such as might be found in a mall, when on a sidewalk stroll, etc.). Subscription-less communication is characterized by one or more of the following conditions: volatility (e.g., frequent changes), no necessity for permanent storage (e.g., localized advertising, etc.), anonymity (no security key), and privacy.

Subscription-less data services may be useful in a wide variety of possible scenarios; for example, any wireless network host may provide disposable media (e.g., advertisements, broadcasts, multicasts, user incentives, etc.) via a subscription-less service. Ideally, wandering users can consume such services without any long term commitments (e.g., contracts, minimum required service periods, etc.).

A number of various commercial scenarios are envisioned for use with cellular or other wireless subscription-less access; see discussion of business methods and rules engine provided subsequently herein.

Unfortunately, in the framework of the prior art cellular access control methods, each time the UE 112 moves from one subscription-less area 302 to a new area, the UE re-initiates registration (see FIG. 2) prior to receiving the subscription-less access. The corresponding traffic necessary to affect such repeated registrations can be detrimental on multiple levels. Firstly, the UE must repeatedly transmit its IMSI over the air (202; see FIG. 2); such frequent exposure of sensitive user information is undesirable. Secondly, in some scenarios, the subscription-less service may be provided by a third party such as a femtocell operator (a femtocell is a simple base station operated by a third party to improve localized cellular service). For similar reasons, it is undesirable to provide user information (such as the IMSI) to a third party operator. Thirdly, the UE and the Core Network entities (e.g., MME, HLR, etc.) must engage in frequent, extended message exchanges. These authentication processes are expensive in terms of network resources and device computation/processing overhead. Other reasons of why to avoid such repeated registrations (e.g., ostensibly greater mobile device power consumption, etc.) will be readily apparent to those of skill in the arts.

Accordingly, the benefits associated with the prior art access control methods of cellular networks are not necessary, and in some cases detrimental to, subscription-less operation.

Co-owned and co-pending U.S. patent application Ser. No. 12/567,327 entitled "METHODS AND APPARATUS FOR DYNAMIC IDENTIFICATION (ID) ASSIGNMENT IN WIRELESS NETWORKS" previously referenced and incorporated herein, discloses various exemplary techniques for deriving a temporary user ID or pseudonym based on a channel characteristic such as e.g., Channel Impulse Response (CIR), which are useful in conjunction with one or more aspects of the present invention. The following discussions provide a brief overview of Channel Impulse Responses (CIRs), and one illustrative example of a CIR-based user access control scheme such as that presented in the aforementioned patent application.

Channel Impulse Response (CIR)—

Figure 4:
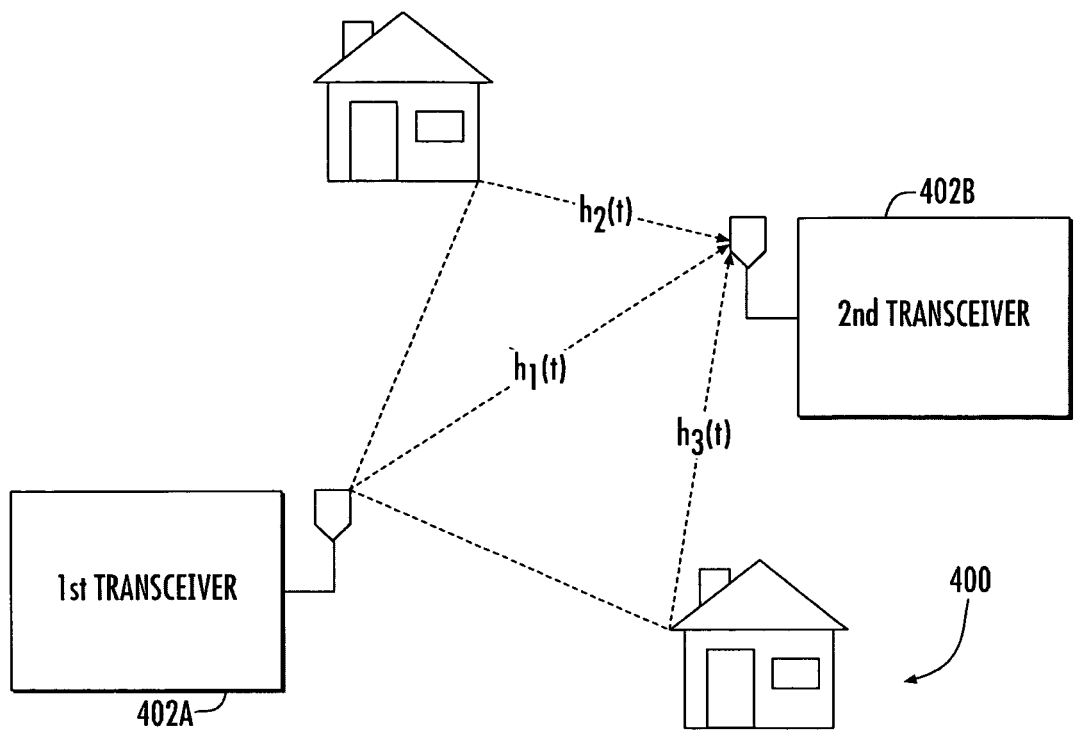
FIG. 4 is a graphical illustration of a multipath environment between two transceiver devices useful for illustrating the various quasi-unique properties of multipaths useful with the present invention.
Figure 5:
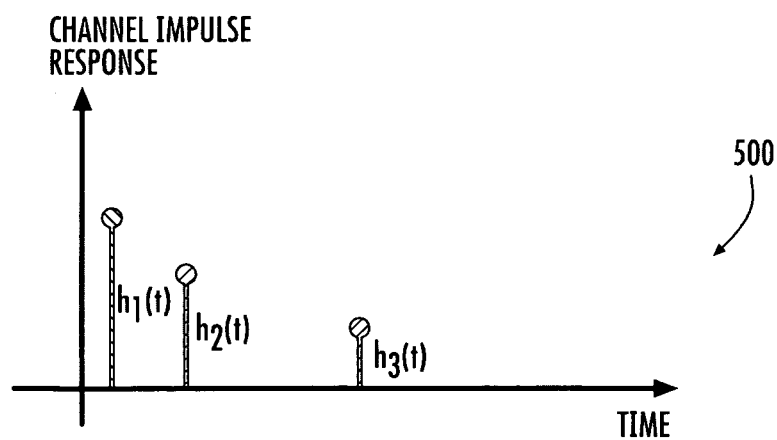
FIG. 5 is a graphical representation of one exemplary Channel Impulse Response as represented in the time domain.

FIG. 4 depicts one exemplary radio environment 400 comprising a first transceiver 402A, a second transceiver 402B, and a multipath radio link, useful for illustrating various aspects of the present invention. The radio environment 400 has a unique waveform propagation profile between the first and second transceivers. Three (3) different radio paths (collectively referred to as a multipath) are shown between the first and second transceivers. As illustrated in FIG. 5, the multipath characteristics 500 can be symbolically demonstrated with a Channel Impulse Response (CIR), where a hypothetical impulse transmitted from the first transceiver is represented with its incident response at the second transceiver at a time delay.

Figure 6:
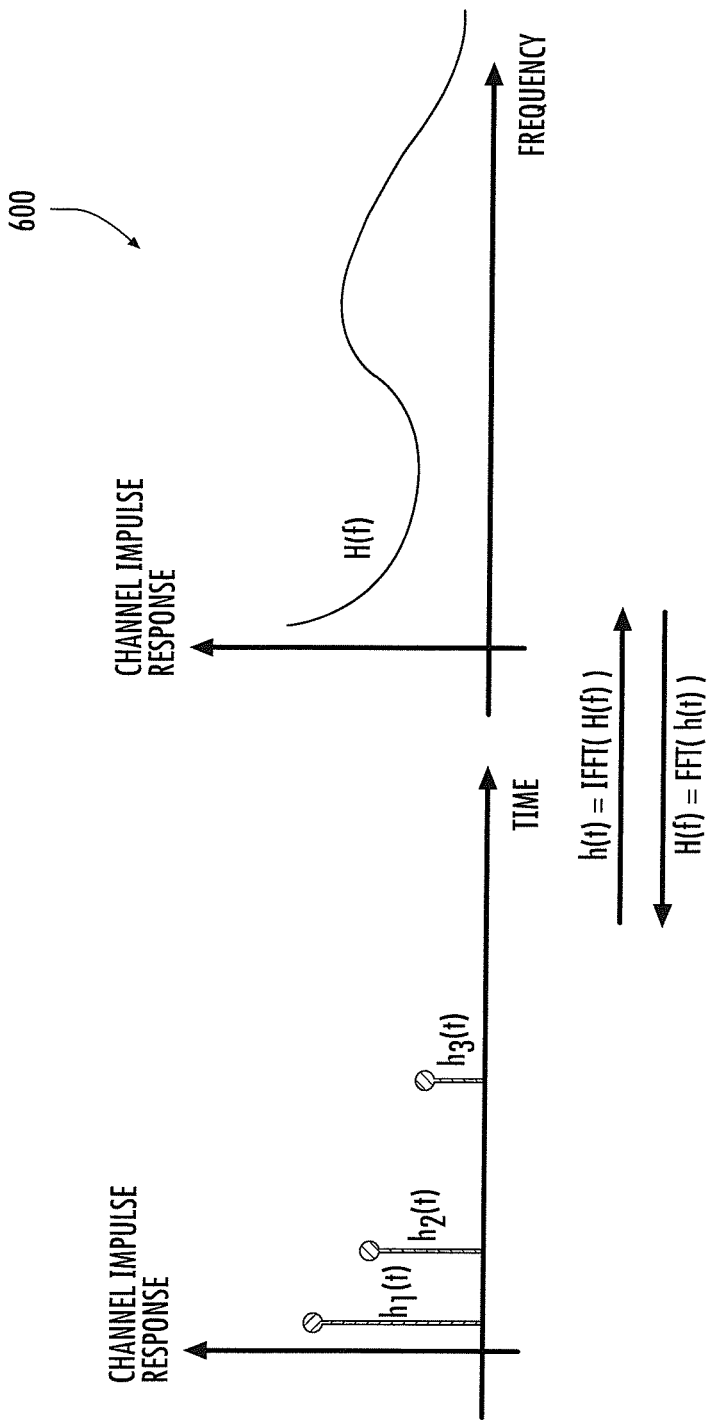
FIG. 6 is a graphical illustration of the relationships between the time domain and frequency domains, and their application to Channel Impulse Response in accordance with the present invention.

Moreover, the CIR 500 may be represented in both time and frequency. FIG. 6 illustrates a conversion between a time domain CIR and a frequency domain CIR. The time domain CIR is represented with the transfer function h(t), and the frequency domain CIR is represented with the transfer function H(f). The time and frequency domain are related to one another by the Fourier Transform (e.g., FFT), and Inverse Fourier Transform (e.g., IFFT). The two domains for CIR representations are mathematically equivalent, and may be used interchangeably. However implementation-specific considerations may govern CIR domain representation. For example, in OFDMA implementations, demodulation is performed within the frequency domain and thus the frequency domain CIR is generally used. Conversely, CDMA implementations may track time domain "fingers" thus, a time domain CIR may be more easily implemented.

The Channel Impulse Response 500 between two transceivers 402 has several important properties: i) uniqueness, ii) reciprocality, and iii) randomness, each of which is now described in greater detail.

i) Uniqueness of Multipath OTA Channels—

A "unique" multipath is distinguishable from all other multipaths. As shown in this illustrative example (FIG. 4), the first transceiver 402A has a direct path to the second transceiver 402B via a "line of sight" represented with $h_1(t)$. Two secondary paths are shown, represented with transfer functions $h_2(t)$ and $h_3(t)$ respectively. Each of the transfer functions $h_X(t)$ represents the transmission channel delays, attenuation, and phase shift characteristics specific to the path. Channel characteristics have a wide number of contributing factors. For example, common examples of predictable factors are design of the RF frontend, distance of propagation, etc. Unpredictable factors may be caused by internal device noise, external device noise, weather, reflection surfaces, movement, etc.

While channel characteristics are not truly "unique" in the strict mathematical sense, in virtually every practical implementation, the multipath signature is unique among the base of users. The multipath characteristics between a transmitter and a receiver depend on their geographic locations, the very specific surrounding elements (e.g., houses, metallic items, etc.), and the device's location with respect to the elements. Thus, even a small difference (on the order of a few millimeters) can impact the multipath characteristics significantly. The probability of two distant devices having exactly the same surrounding elements, positioning, etc. is extraordinarily unlikely, so as to for all intents and purposes never occur in practical use. Thus, uniqueness (or quasi-uniqueness) is virtually guaranteed. As used herein the terms "uniqueness", and "quasi-uniqueness" refer to any communications link having substantially unique channel characteristics in both transmit and receive directions.

ii) Reciprocity of Multipath OTA Channels—

Multipaths have identical characteristics in both forward and return directions. Referring back to FIG. 4, the illustrated forward path from the first transceiver 402A to the second transceiver 402B is physically identical to the return path (i.e., from the second transceiver to the first transceiver). The following discussion provides a brief description of the limitations on "reciprocity" of the multipath OTA channels.

Radio channels are intrinsically commutative (i.e., order does not matter). For example, attenuating an RF signal by 3 dB (roughly one half), and 10 dB (roughly one tenth), has a net result of 13 dB (roughly one twentieth). Accordingly, the channel effects experienced by a first transmitted signal along a first path are identical to the channel effects experienced by a second transmitted signal in the reverse direction of the first path. In practical implementations, this assumption is not entirely accurate, as receive and transmit paths may be slightly different in various radio technologies. For example, some attenuation effects may be frequency dependent (e.g., rain fade affects higher frequency channels at greater levels than low frequency channels, etc.). Thus transceiver systems 402 which have distinct receive and transmit frequencies (e.g., Frequency Division Duplex (FDD), etc.) may exhibit slight differences in attenuation.

Radio channels are also time invariant. Time invariant systems do not exhibit hysteresis, or "memory". For example, a radio channel which sends a time invariant impulse at time $T_1$ and $T_2$ will have identical outputs at shifted times. In practical implementations, the radio environment is not perfectly time invariant. Certain environmental factors can affect delay and attenuation over time. Even though some channels characteristics may exhibit drift (e.g., due to movement, weather changes, etc), many of these effects are rendered insignificant due to the data rate of current technologies.

Despite some minor variations due to practical implementation, the reciprocity of the multipath between the first transceiver 402A and the second transceiver 402B ensures that the CIR 500 of the forward path will be "substantially" identical to the CIR of the return path. As used herein the terms "symmetric", "reciprocal", and "bidirectional" refer to any communications link having substantially similar channel characteristics in both transmit and receive directions.

iii) Randomness of Multipath OTA Channels—

One intrinsic property of multipath profiles (and other transmission characteristics) is their inherent unpredictability. As previously mentioned, the transfer function of a transmission channel is simultaneously influenced by multiple truly random events such as internal device noise, external device noise, weather, reflection surfaces, movement, etc.

Multipath characteristics are highly localized. The cumulative effects of multipath interference are unique to within a single wavelength (e.g., around 15 cm for 2 GHz frequency). The difference of just a single wavelength causes different reflections, propagation delays, and phase changes and attenuations. Accordingly, even two. UEs 112 separated by meter will experience significantly different multipath effects. Understandably, UE movement further enhances the unpredictability of multipaths.

CIR Based User Identity—

Figure 7:
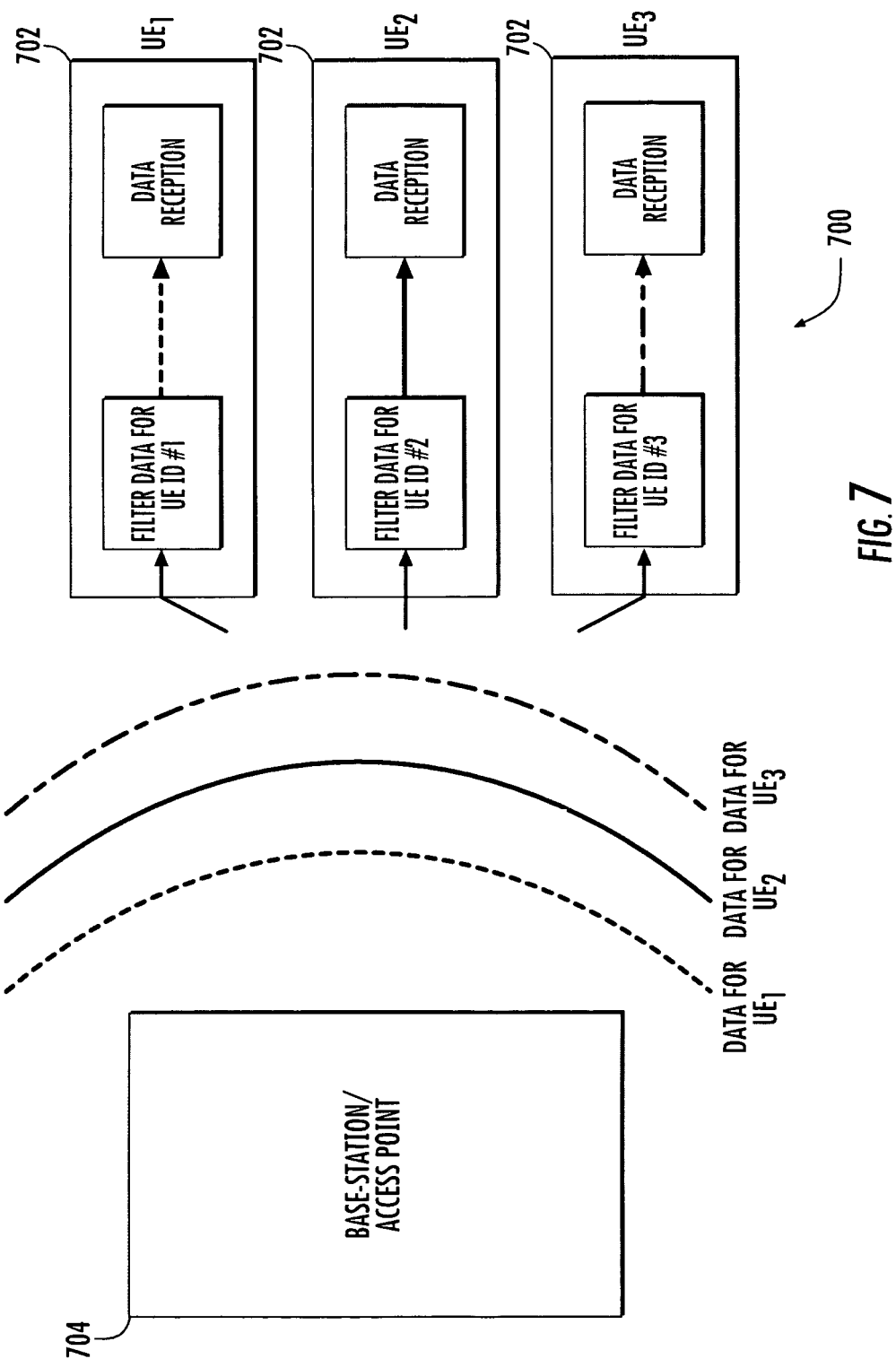
FIG. 7 is a high level diagram of one exemplary cellular network comprising a base station and three (3) user equipments, where the base station is providing subscription-less data services for each of the user equipment, in accordance with the present invention.

Co-owned and co-pending U.S. patent application Ser. No. 12/567,327 entitled "METHODS AND APPARATUS FOR DYNAMIC IDENTIFICATION (ID) ASSIGNMENT IN WIRELESS NETWORKS" referenced above discloses various exemplary user access schemes useful for illustrating one or more aspects of the present invention. In particular, the CIR-based user ID scheme disclosed therein combines the unpredictable properties of multipath over-the-air (OTA) channels within the cellular architecture, to provide anonymous subscription-less data services. Referring now to FIG. 7, one such cellular communication system that exploits a wireless link between User Equipment (UE) 702 and Base-Station (BS) 704 is shown. Each communication link requires a Unique ID 706. To maintain anonymity, only the UE and the Base-Station should maintain the same user ID. For reasons previously cited, the ID assignment is preferably not transmitted over the air interface.

In this user access scheme, the momentary Channel Impulse Response (CIR) for the multipath between the UE 702 and BS 704 is used to derive a user ID or pseudonym. Referring back to the unique properties of the CIR, the pseudonym will suitably provide a truly random user ID which cannot be "guessed" by any (malicious) third parties. In fact, a pseudonym based on the CIR is completely anonymous, even to the BS operator. Furthermore, due to the reciprocal properties of the multipath OTA channel, both BS and UE will have substantially identical user IDs for one another, without any significant message exchange. Such "blind detection" of a user ID is especially useful for reducing message exchanges and processing overhead.

The pseudonym is derived from the momentary CIR between the BS 704 and the UE 702. Once both devices have sent data, the CIR can be estimated by each device independently of the other. During CIR estimation, a wide variety of contributing factors may alter the CIR ever so slightly. Yet, if a precise "match" of the CIR signature is not present (or as previously noted, given existing encryption methods, a difference of even one (1) bit in an encryption key or result is produced) it may cause failure of the link to operate properly. Thus, practical problems relating to, inter alia, the quality of the radio channel, etc. may complicate operation of the aforementioned user access scheme. In current implementations of radio technology, significant amounts of distortion may be caused by thermal noise, radio channel fluctuations, and/or movement. Higher quality components are typically less susceptible to such effects, but are associated with significantly higher cost. Moreover, unlike dialog-based user identification methods, in certain implementations, the aforementioned "blind detection" of user identity using channel characteristics such as CIR is a "one-shot" process, and is performed without further message exchange.

The present invention advantageously overcomes these disabilities, thereby allowing such "one-shot" blind detection if desired, and use of encryption processes, in conjunction with the aforementioned channel-based link(s).

Example Operation—

The following discussion illustrates various useful aspects of the present invention for blindly detecting user identification based on channel characteristics. In one exemplary embodiment, the accuracy of channel measurement metrics is adjusted (e.g., by reducing quantization granularity) based on one or more criteria, such as for example requirements for an user identification process. It should be noted that one or more separate levels of accuracy of the CIR may also be kept for channel transmission adjustment (as known throughout the arts), or yet other functions. Thus, in at least one exemplary embodiment, the use of CIR for user identification is independent of any CIR maintained for transmission channel operation. Alternatively, in other embodiments the use of CIR for user identification may be reused for transmission channel operations.

As known by those skilled in the digital communication arts, channel impulse response quantization bit errors (e.g., caused by thermal noise, etc.) generally occur between neighboring quantization levels (typically directly above or below the true value). Thus, reducing the quantization level increases the probability of correct quantization. Accordingly, in one embodiment of the present invention, the quantization of a CIR-based user ID is adjusted based on a relative noise level.

In other embodiments, the CIR-based user ID has an associated "level of tolerance". The level of tolerance is adjusted to current noise margins, and adds some degree of leniency to user ID interpretation. For example, if a received user ID's degree of error is within a tolerable range, the receiver device will assume that the ID is correct. In another example, if an encryption key is incorrect, the tolerable range is used to "guess" appropriately.

It should be noted for clarity that as used in the present context, the level of tolerance and quantization granularity may be treated as two (2) distinct processes, which when combined, can be used to address various implementation-specific issues. As will be readily appreciated by those skilled in the arts given the present disclosure, quantization granularity can in many situations be interchangeably used with the level of tolerance as a design choice; i.e., a larger quantization granularity is equivalent to larger levels of tolerance, and vice versa. However, a distinction can be made as to when such processes occur. For example, quantization occurs during the determination of the pseudonym, user identity, or encryption key. In contrast, the level of tolerance is used to determine equivalency of a pseudonym with user identification, or search for an appropriate encryption key. Thus, in certain embodiments, a higher degree of granularity may be preferable (such as with a low cost radio transmitter having poor receptivity). Or, in other embodiments, a higher level of tolerance may be preferable, such as for high mobility (where noise affects some paths more than others). Hence, the present invention contemplates the foregoing various applications and combinations of these two processes.

In the following scheme, the user ID may retain a degree of inaccuracy throughout operation (which can also vary); however, it is appreciated that unlike typical access control schemes (which require bit exact operation), the requirements for ad hoc operation are substantially less rigorous.

Furthermore, in a typical ad hoc communication framework, many (up to several thousand) carriers may be used. In one embodiment of the present invention, the channel characteristics of the carriers are used to derive a user identity, or pseudonym for a subscriber device. While several thousand carriers would in some cases not provide enough uniqueness to identify a given user on a network-wide basis, it remains more than adequate for identification on an ad hoc network (ad hoc networks are generally small, and quite geographically limited). Moreover, while minor inconsistencies in user ID may be caused by non-ideal interferers, it is appreciated that actual malicious parties are still unable to guess correct user IDs (to any degree of precision), due to the highly unpredictable and dynamic nature of CIRs.

Referring back to the illustrative exemplary subscription-less data connection initiation between a BS 704 and UE 702 (FIG. 7), the BS receives the subscription-less access attempt from the UE, and estimates a first CIR. The first CIR-based user ID is used to provide the requested service via broadcast, multicast, unicast, point-to-point communication, etc. The UE receives the service data, and estimates the communication channel to obtain its own copy of the user ID or pseudonym. If the difference between the UE's derived pseudonym and the requested service's user ID (i.e., BS's derived pseudonym) is within a level of tolerance, then the UE consumes the service data. Similarly, if the UE transmits data to the BS, the BS may compensate for discrepancies in the requesting user ID, using analogous processes. These processes will generally be symmetric in terms of tolerance level due to the substantial reciprocity of the wireless channel as described previously herein; however, it will be appreciated that other factors may be considered by the US and/or BS in setting their respective tolerance levels. For example, it may be that the BS is less concerned about CIR signature "precision" in the outgoing (transmitting) direction, but more concerned in the incoming (receiving) direction, since e.g., surreptitious consumption of a service may be more benign to the BS or network operator than incoming (and potentially malicious) communications. Similarly, the tolerance may be dependent upon the number of served UEs. For instance, if a BS is connected with many UEs, the BS may require a higher precision in CIR calculation, so as to distinguish between a larger number of user IDs.

Moreover, a standard cellular BS is generally significantly more capable than the population of UEs that it services. Accordingly, the BS may utilize much more complicated and precise methods than the UE for channel estimation and error compensation. In another example, a first device may use a frequency domain CIR, while the second device uses a time domain CIR; either the first or second party may use the appropriate transform such that both devices are comparing equivalent CIRs (i.e., IFFT, FFT, etc.).

Alternatively, while services may be provisioned using the blindly detected user ID, either of the two parties (UE 702, BS 704) could subsequently update their blindly detected user ID to closely track its counterpart. For example, if the UE determines that the requested service's user ID (i.e., the BS's assumed user ID) is different from its derived user ID, the UE may simply update its derived user ID with the requested service user ID value to bring both parties in sync. This can be based for example on the BS being a known or trusted source, and hence having a low probability of being a "spoof" communication. Moreover, the degree of precision or measurement capabilities of the UE may be substantially less than those of the BS (simply due to the UE being a user commodity electronic device, and hence having lower cost/less precise RF front end and processing components); the UE can then "defer" to the BS for its CIR signature, thereby precisely synchronizing both devices to what is closer to the "true" CIR ID.

It will also be appreciated that the estimation of the CIR ID or signature can involve multiple detections. For instance, a UE or BS might gather n (n being an integer) CIR readings and mathematically average them together (or otherwise mathematically process them according to a scheme, such as a weighting that weights the first or last reading more heavily than that taken immediately after or before it, respectively, or derives statistics such as standard deviation, variance, etc. and uses these as bases for estimating the "nominal" CIR signature for the channel) to arrive at the estimate used as the user ID. To this end, the aforementioned "deferral" approach can be used or combined as well, such as where the UE combines (e.g., averages, weights, determines statistics, etc.) based on both its received CIR, and that of the BS, or vice versa.

Furthermore, as previously discussed, there is in certain embodiments of the invention a distinction between values which are used "as is" e.g., user identity, signature, etc., and values which are processed or used in some form of calculation e.g., for encryption keys. As described in greater detail elsewhere herein, the level of tolerance provides a "range" over which a value may be considered. The determination of success over the range may require computation or mathematical processes beyond simple comparison. Consequently, a description of methods for adapting one or more aspects of the present invention for use with encryption calculations, etc. is also presented herein.

Methods—

Figure 8:
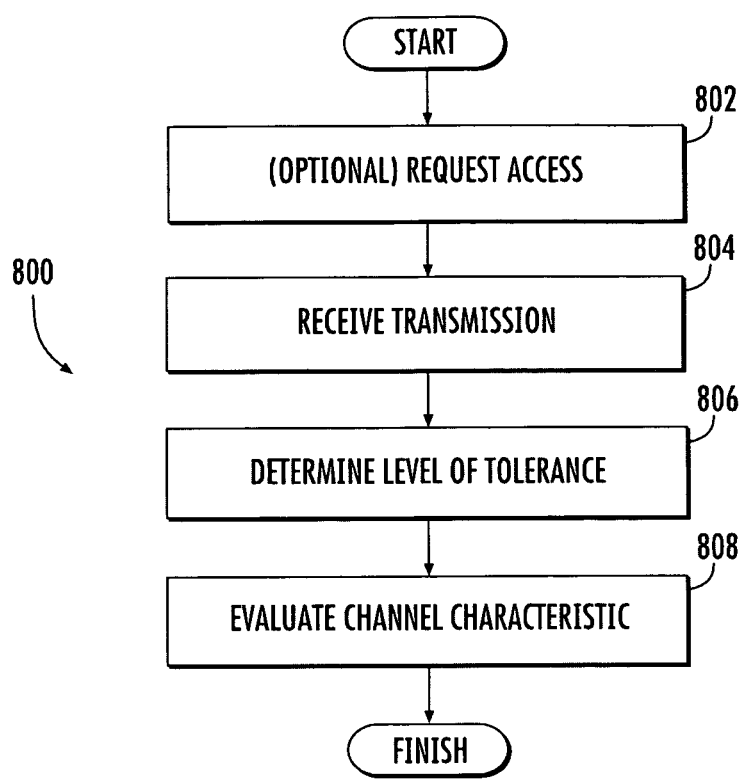
FIG. 8 is a logical flow diagram of an exemplary embodiment of the generalized process for determining a level of tolerance in a channel characteristic based user identification scheme, in accordance with the present invention.

Generalized methods for compensating for differences in user identities and/or encryption keys derived from radio channel characteristics are now discussed in greater detail. Referring now to FIG. 8, a generalized recognition procedure 800 executed in accordance with the principles of the present invention is illustrated. The operative elements as described with respect to the methodology of FIG. 8 are a first device, and a second unknown device. In some embodiments, the first device and the second device may have different device capabilities, such as is common in cellular networks (e.g., a UE and a BS, a Wi-Fi client and access point, etc.). In other embodiments, the first and second devices are peer devices; each having substantially identical device capabilities, such as is common in ad hoc networks (e.g., two WLAN peer devices, certain types of PAN devices, "walkie-talkie" type devices, etc.). It is appreciated that in the foregoing examples, each device my act as both a provider and requester (i.e., roles can be reversed), whether simultaneously or at different times.

While the following method is described with respect to a first device blindly detecting and compensating for a data transmission from a second device, it is appreciated that the second device must execute the complementary process. For example, when the first device "identifies" the second device via the return path (i.e., sends a signature indicative of the forward path of the wireless channel) the second device uses a complementary compensation scheme to identify the first device. While the complementary compensation schemes may not be identical in operation, the parameters for channel estimation (e.g., CIR) must be identical between the first and second devices. In one exemplary embodiment, the first and second devices utilize identical methods for error compensation. In alternative embodiments, the first and second devices may not utilize identical methods for error compensation, as previously noted.

At step 802, the first device may request access from an unknown second device if desired or required. For example, in one exemplary embodiment, a BS broadcasts a control channel which indicates one or more subscription-less data services (e.g., such as via a Broadcast Control Channel (BCCH), etc.). At least initially, the BS may be an unknown provider device to a wandering UE. Thus, the UE demodulates the BS's control channel information. If the UE determines that the subscription-less service is of interest, then the UE requests access to the subscription-less service (e.g., such as via a Random Access Channel (RACH) message, etc.). Alternatively, the presence of a second device may be signaled to the first device via out-of-band methods. For example, in a wireless ad hoc network, a WLAN (e.g., Wi-Fi) client may receive notifications of nearby access points via a service discovery protocol (such as for example the exemplary Bonjour protocol developed by the Assignee hereof). Such service discovery protocols may additionally publish supplemental information about the content and format of the subscription-less services offered by the second device. If the Wi-Fi client desires the services, then it may initiate access to the AP device.

At step 804 of the method, the first device receives a data transmission from an unknown second device, and estimates one or more channel characteristics. In one exemplary embodiment, the Channel Impulse Response is a representation of received signal magnitude as a function of time (see FIG. 6, time domain). In another exemplary embodiment, the Channel Impulse Response is a representation of received signal magnitude as a function of frequency (see FIG. 6, frequency domain). Other common representations within the applicable arts include representations of amplitude, time, frequency, phase, spatial diversity, etc.; it is appreciated that myriad channel representations could readily be substituted by those skilled in the arts given this disclosure. In one embodiment, the Channel Impulse Response is produced as an output of a rake receiver (e.g., a table of "fingers", where each finger is represents the result of a correlator, at a time offset). In another embodiment, the Channel Impulse Response is an output of a FFT (e.g., a table of spectral energies, at frequency offsets).

While the following discussion refers to Channel Impulse Responses represented with respect to magnitude, it is appreciated that other types of channel characteristics could easily be substituted (or used in combination) by one having ordinary skill in the arts, given the present disclosure. For example, in one embodiment, the channel characteristics may include an array of distances between time domain channel impulse response components (i.e., where the relevant characteristic is a time difference, rather than a magnitude difference). In another embodiment, a listing of phase differences of the received signal in time and/or frequency domain may be used. In fact virtually any combination or set of channel characteristics could be used, provided that the channel characteristics are sufficiently unpredictable to an outside observer, and that the channel characteristics have substantially reciprocal properties at both the transmitter and receiver.

Moreover, while certain channel characteristics may be directly used, some channel characteristics have important properties when further processed. For example, differential values of a channel impulse response may have distinct noise compensating properties. Differential and relative calculations for instance may be useful with respect to fading channels which affect the transmission path. A first path which is twice as powerful as a second path generally remains twice as powerful, even as fading changes. Thus, a relative representation (such as a fractional, or percentage) of the channel impulse response has substantial resistance to fading effects. Similarly, a first path which is higher in magnitude or other characteristics than a second path retains this difference, even when the noise floor increases. Thus, a differential representation (such as a difference, or subtraction) of a first and second path is resistant to noise floor changes.

Figure 9:
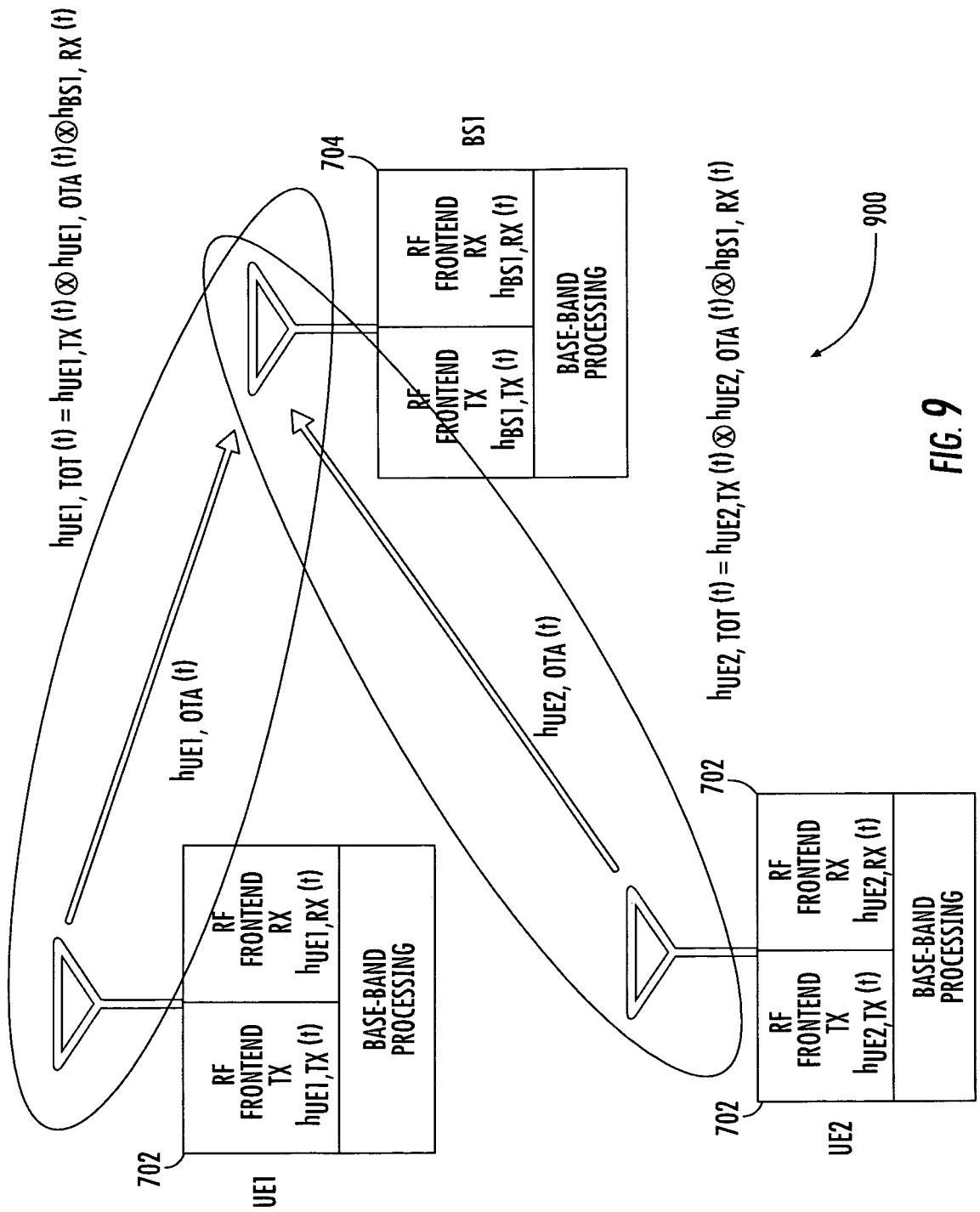
FIG. 9 is a graphical illustration of one exemplary embodiment of the reverse link illustrating the aggregate Channel Impulse Response in the reverse direction, in accordance with the present invention.
Figure 9A:
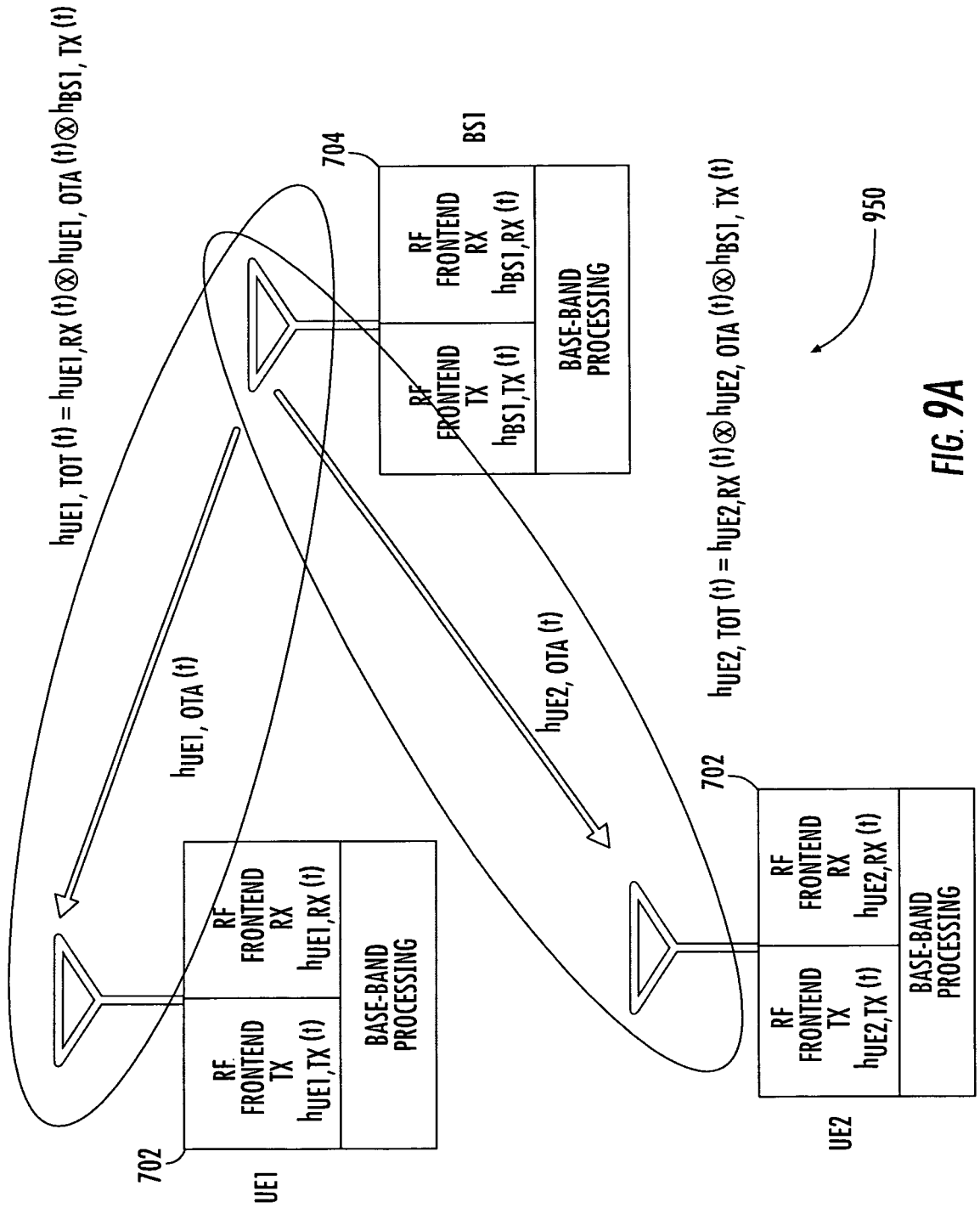
FIG. 9A is a graphical illustration of one exemplary embodiment of the forward link illustrating the aggregate Channel Impulse Response in the forward direction, in accordance with the present invention.

FIGS. 9 and 9A illustrate one exemplary high-level cellular radio system comprising two UEs 702 and one BS 704 entity. Each of the entities has a Transmit and Receive RF frontend having a characteristic impulse response 500 (i.e., UE1 has the CIRs $h_{UE1,TX}(t)$, $h_{UE1,RX}(t)$; UE2 has the CIRs $h_{UE2,TX}(t)$, $h_{UE2,RX}(t)$; and BS1 has the CIRs $h_{BS1,TX}(t)$, $h_{BS1,RX}(t)$). The characteristic impulse response of each RF frontend is predominantly determined by design implementation, component tolerances, etc. Furthermore, the OTA link has a characteristic impulse response which is unique to each multipath. As is well known throughout the radio transmission arts, the overall path from each UE to the BS (and return paths), is calculated by convolving the CIRs of the RF frontends, and the OTA channels. In alternative embodiments, this calculation may be done in the frequency domain using simple multiplication. FIG. 9 illustrates the aggregate CIR in the reverse direction (UE to BS) 900, and FIG. 9A illustrates the aggregate CIR in the forward direction (BS to UE) 950.

In one exemplary embodiment, the first device performs a standard quantization of the received channel gains. Such quantization may include generalized rounding, ceiling rounding, floor rounding, etc. Similarly, rounding may take into account "hysteresis" (or state memory). While radio channels do not exhibit hysteresis themselves, temporary changes to a channel may cause erratic glitches which can be ignored. Hysteresis is useful for settling "cusp" values during rounding (e.g., the midpoint is a cusp value for general rounding and may cause jitter effects as the value jumps between the two neighboring values).

In another exemplary embodiment, only a subsection of the entire channel impulse characteristic is evaluated. For example, in an Orthogonal Frequency Division Multiple Access (OFDMA) scheme, only the channel gains of the in-band carriers are of interest. The in-band carriers have a substantially flatter RF response and exhibit very low distortion. Similarly, in other radio access technologies, certain portions of the reception window may be immediately disregarded. For example, a path or multipath that is extremely "late" (i.e., in excess of a maximum allowable time delay) may be ignored in time slot based radio access technologies.

In one variant, the degree of quantization is selectable. For example, a CIR having a relatively high signal to noise ratio (SNR) will have many distinct multipath peaks. In contrast, a CIR of relatively low SNR will generally have multipath peaks which are muddled together. A high-SNR radio environment is capable of supporting a relatively large number of first devices. A high-SNR environment should exhibit distinct multipath signatures which are easily distinguished even among many users. Similarly, a low-SNR radio environment may be near capacity, and generally cannot support many users at all. Moreover, either first or second devices may postpone service, rather than use a muddled (and potentially confusing) multipath. Accordingly, in one such variant, higher accuracy quantization is used in high-SNR environments, whereas lower accuracy quantization is used in low-SNR environments.

In one embodiment, the provider selects a "fixed" portion of the channel characteristics for quantization. For example, in an OFDMA system, the quantized coefficients of the CIR of the entire bandwidth (e.g., the received spectral energy for each subcarrier) may represent the path from the UE to the BS. In an alternate embodiment, the provider dynamically selects a portion of the channel characteristics for quantization. For example, in an OFDMA system, the quantized coefficients of the CIR for only a portion of the entire bandwidth (e.g. only the pilot channel, etc.) are used to represent the path from the UE to the BS.

The provider may additionally broadcast optimization information useful for determining a pseudonym, user ID, encryption key, etc. In one variant, such information may directly apply or relate to the quantization of channel impulse responses. For example, the provider may indicate that the time domain CIR should be quantized for pseudonym generation. Alternately, the provider may indicate that the frequency domain CIR should be quantized for pseudonym (user ID, encryption key, etc.) generation. Such information may also pertain to the degree of quantization, e.g., a range of time slots, frequencies, bases for pseudonym generation (for example, "only the best three (3) peaks are used for pseudonym generation", etc.), etc. In one variant, a cellular base station provides such information as part of a system information block (SIB), or a master information block (MIB) described in greater detail hereinafter. In another variant, the information is embedded within the data transmission (e.g., in the payload of the message).

Within UMTS, the RRC sub-layer is used to broadcast System Information in the downlink channels; the specification governing RRC sub-layer operations is the 3GPP TS 36.331: "E-UTRA Radio Resource Control (RRC) Protocol", v8.2.0 (Release 8) which is incorporated herein by reference in its entirety. System Information (SI) is embedded within RRC messages carrying a plurality of System Information-Blocks (SIBs). There may be more than one System Information RRC message transmitted with the same schedule (and/or periodicity). Each SIB contains a set of related system information parameters.

Two special versions of System Information (SI) RRC messages (System Information Master (SI-M), and System Information 1 (SI-1)), only carry a single SIB, namely the MIB and the SIB Type 1 respectively. The Master Information Block (MIB) includes a limited number of most frequently transmitted parameters. SIB Type 1 messages contain the scheduling information that indicates when the other System Information (SI) RRC messages are transmitted (such as their start times).

The SI-M message is mapped on the Broadcast Control Channel (BCCH) logical channel and carried on the Broadcast Channel (BCH), which is a downlink transport channel All other System Information (SI) RRC messages including SI-1 are mapped on the Broadcast Control Channel (BCCH) logical channel and dynamically carried on the Downlink Shared Channel (DL-SCH) (another downlink transport channel). The SI-M has a periodicity of 40 ms, whereas SI-1 has a periodicity of 80 ms; both of which are transmitted on a fixed schedule. Reception of either BCH or DL-SCH channels does not require an active RRC connection. In fact, both channels are typically used while a UE is operating without a RRC connection (e.g. RRC_IDLE mode). Each System Information (SI) RRC message is transmitted in a periodically occurring (time domain) window, having a defined semi-static starting point and length, The SI-windows are non-overlapping, and the sizes of all SI-windows are the same. SI-1 configures the SI-window length and the transmission periodicity for the other System Information (SI) RRC messages. A SIB cannot be spread over multiple consecutive SI RRC messages. However, one SI RRC messages may comprise multiple SIBs (if they have the same periodicity). The mapping of SIBs onto SI RRC messages is flexibly configured, and distributed via SI-1 messages.

System information (SI) changes can only occur during specific radio frames, which are referred to as modification periods. SI RRC messages (with the same content) may be scheduled for transmission a number of times within a modification period. The modification period boundaries are defined by System Frame Number (SFN) having modulo N. The value of N is set by current system information parameters. The aforementioned special SI RRC messages for the MIB and the SIB Type 1 messages have predefined schedules. Every UE can receive the publicly broadcast control messages, by using the standardized schedule.

The MIB uses a fixed schedule with a periodicity of 40 ms. The first transmission of the MIB is scheduled in subframe #0 of radio frames for which the System Frame Number (SFN) modulo 4 (four) equals 0 (zero). Each System Frame includes 10 sub frames. Repeated transmissions of the MIB are scheduled in subframe #0 of all other radio frames.

The following examples illustrate various methods for quantizing a multipath signature in magnitude, frequency, time, phase, etc. Clearly, the following methods may be interchanged, intermixed, used in complementary or alternative fashion, or adapted for other technologies consistent with the invention.

Figure 10:
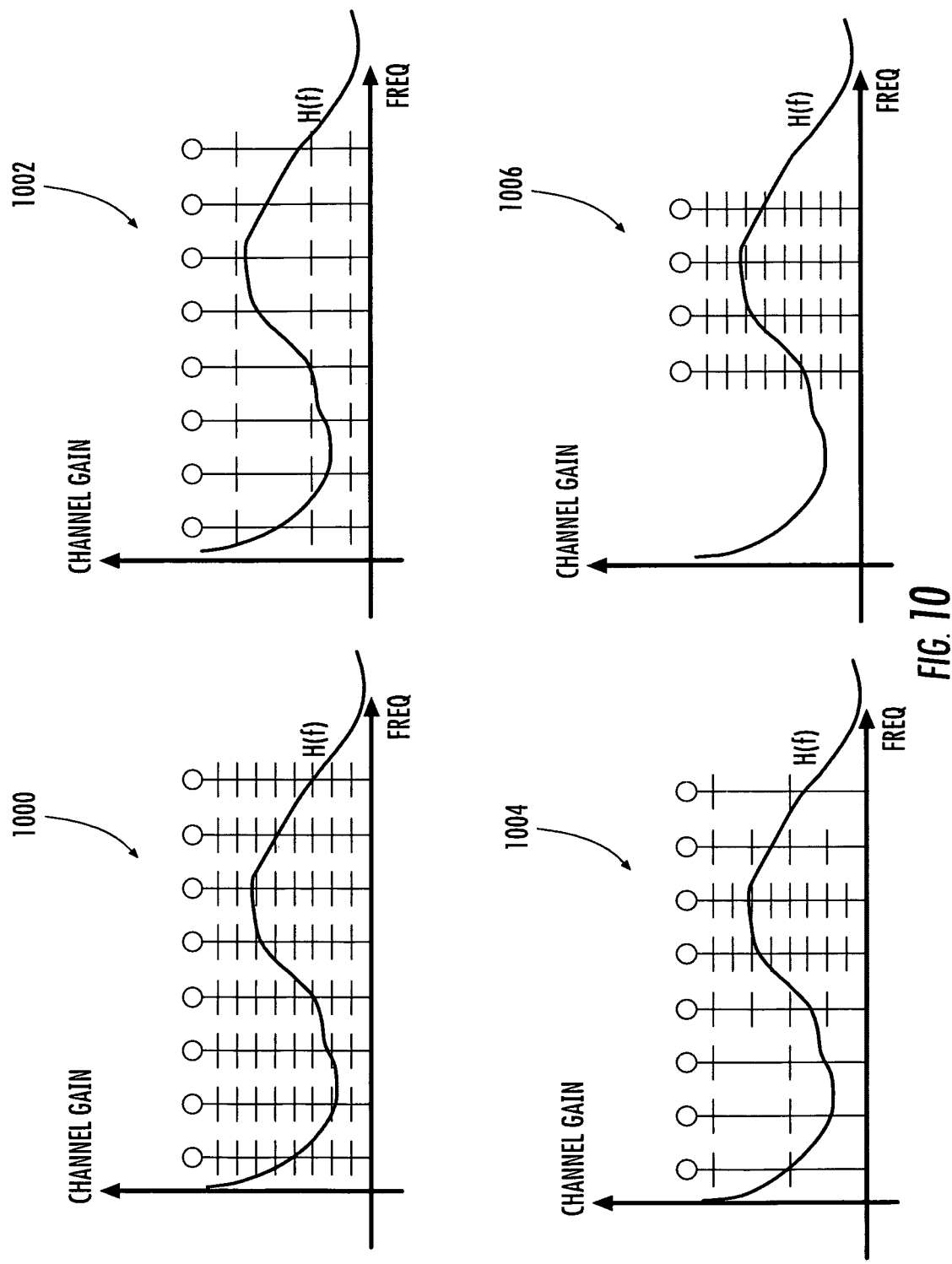
FIG. 10 is a graphical illustration of several exemplary quantization schemes useful with the present invention.

FIG. 10 illustrates the effects of different exemplary variations of quantization for magnitudes. In a first variant 1000, the quantization is a linear scale. In a second variant 1002, the quantization is a logarithmic scale (e.g., dB). In a third variant 1004, the quantization is performed on a relative scale (e.g., the quantization value varies based on a value, such as frequency, channel gain, etc). In one such variant, the quantization varies per frequency (such as may be useful for frequency dependent attenuation, etc.). In yet another variant 1006, the quantization of various multipath peaks may be selectively chosen; e.g., some peaks may be disregarded or weighted less heavily.

Figure 11:
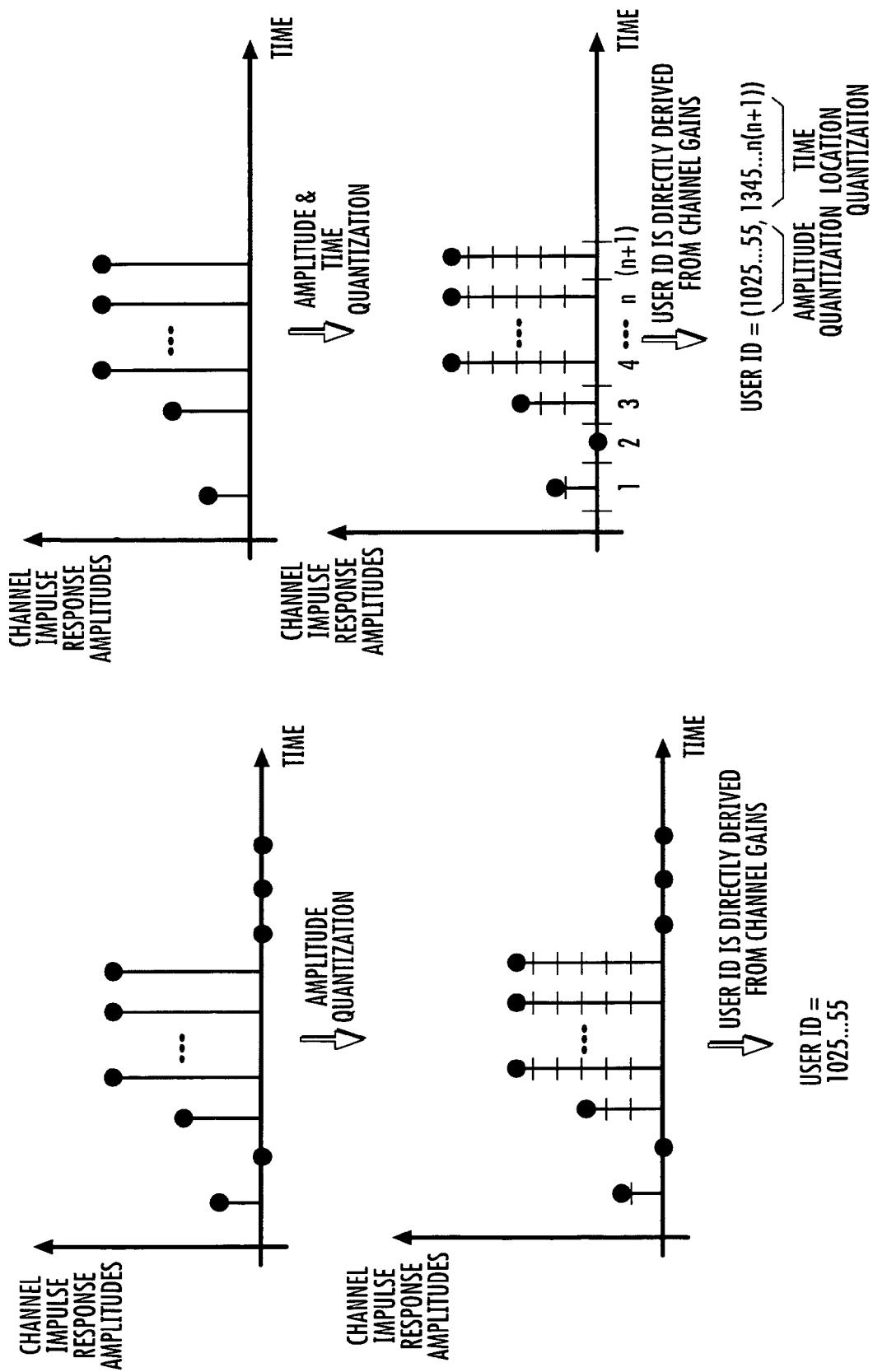
FIG. 11A is a graphical illustration of one embodiment of the quantization operation of a Channel Impulse Response in the time domain in accordance with the present invention.
FIG. 11B is a graphical illustration of one embodiment of the quantization operation of a Channel Impulse Response in the time domain, whereby two dimensions (time, and amplitude) are characterized, in accordance with the present invention.

In alternate embodiments, a requester may collect channel gain information from a time domain CIR. FIG. 11A illustrates one exemplary embodiment for quantizing channel gain information in the time domain. In this example, the channel gain coefficients would specify a pseudonym of [1, 0, 2, 5 . . . 5, 5]. In one such variant, the phase of the complex values channel estimates is disregarded to simplify the calculation. In another variant, the absolute values of the channel gains are used for the pseudonym.

FIG. 11B illustrates yet another embodiment, where the channel gains are sorted into "buckets" or "bucketized" by time. Unlike the frequency domain which has subcarrier frequencies, the time domain has a graduated scale, and does not have convenient categorization. Thus the time domain buckets reflect a range of time domain values. Moreover, in certain embodiments of the invention, the time domain bucket width may be configurable, so as to accommodate for varying degrees of channel consistency. For example, a wider bucket corresponds to a larger degree of time quantization, whereas a narrow bucket provides a high degree of time specificity.

It is further appreciated that the width of buckets is exactly analogous to quantization ranges of amplitudes, but with respect to time. Thus, FIG. 11B also demonstrates a quantization of the Channel Impulse Response in two dimensions: time and amplitude. Accordingly, the prior discussion of various quantization methods is equally applicable to bucket width (e.g., FIG. 10 is also applicable to bucket sizes (e.g., linear, relative, etc.)). In yet other embodiments, multi-dimensional representations of the Channel impulse response may be used. In one exemplary embodiment, a two dimensional pseudonym includes time and amplitude values. The two dimensional pseudonym is formed for example by simply concatenating time results with magnitude results (e.g., $[t_0, t_1 \ldots t_N, A_0, A_1 \ldots A_N]$). In alternate variants, the times and magnitudes are interleaved (e.g., $[t_0, A_0, t_1, A_1, \ldots t_N, A_N]$). Yet other schemes will be recognized by those of ordinary skill in the art given the present disclosure.

Moreover, it is noted that virtually any combination of multi-dimensional channel characteristics (e.g., time versus channel gain magnitude, etc.) can be transformed into a one-dimensional (or smaller ordered) pseudonym (user ID, encryption key, etc.).

In one exemplary embodiment, the quantized channel characteristics are represented with one or more discrete values (e.g., integer, or logical values, including for instance Boolean or even fuzzy logic values). In other embodiments, the channel characteristics may be used directly as a pseudonym (user ID, encryption key, etc.), where the CIR includes one or more continuous values (e.g., floating point values, etc.).

Returning now to the method 800 of FIG. 8, at step 806, the first device determines a level of tolerance. In one exemplary embodiment, in addition to the channel impulse characteristic determination (step 804), the first device also identifies one or more parameters related to quality of reception. Such parameters may be directly inferred from the channel impulse characteristic, or indirectly inferred from other signal quality measures (e.g., BER, SNR, etc.).

Figure 12:
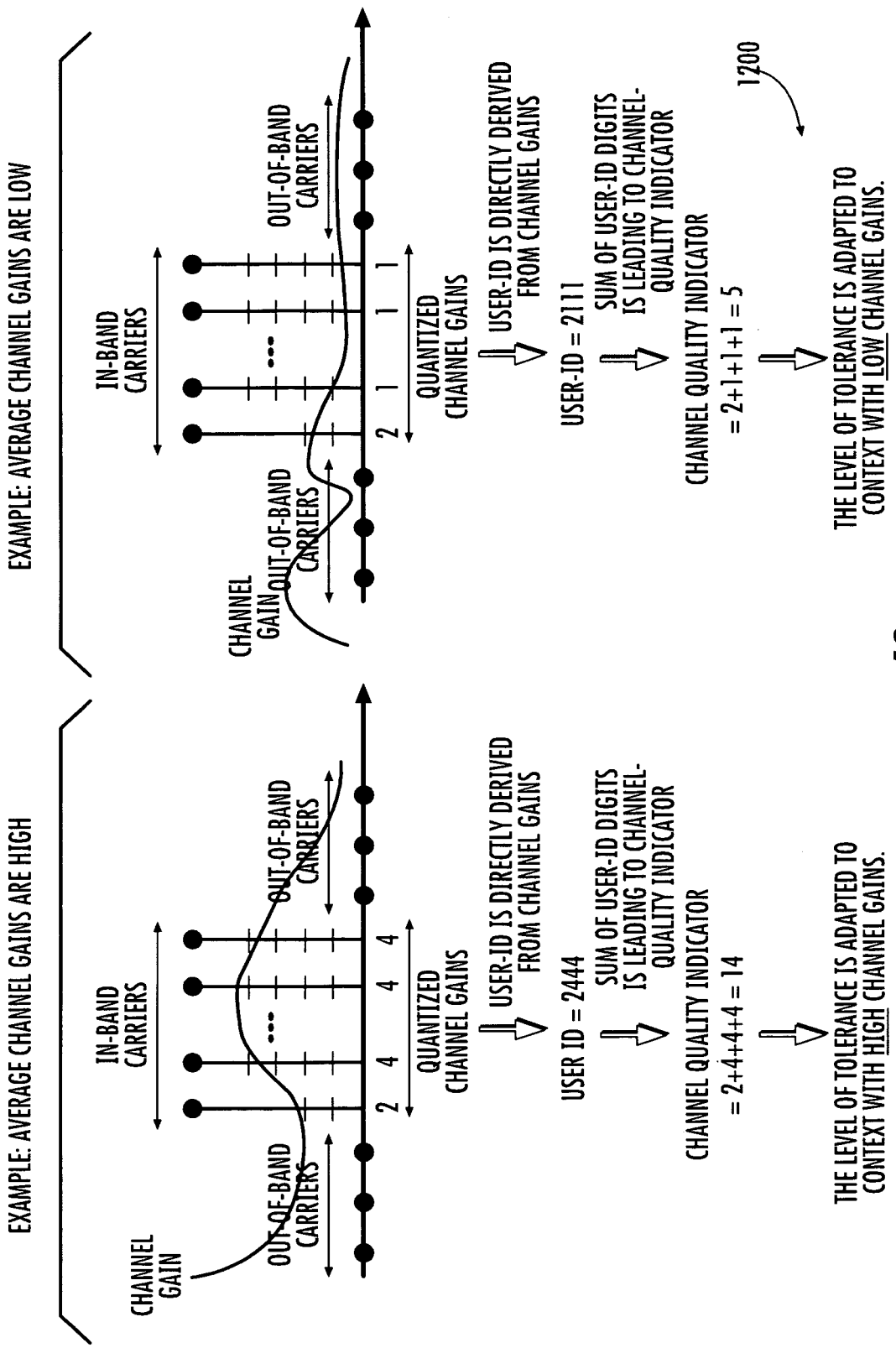
FIG. 12 is a graphical illustration of a comparison between two (2) exemplary quantized Channel Impulse Responses in accordance with the present invention.

In one such variant, the quality or reception is calculated by directly summing the magnitudes of the peaks in a CIR profile. For example, referring to FIG. 12 exemplary channel coefficients for two distinct requester devices are illustrated. In this example, the in-band carrier gain coefficients for the first requester would specify a CIR of [2, 4, . . . 4, 4], and reception has a channel quality indicator (CQI) of fourteen (14), whereas the in-band carrier gain coefficients for the second requester would specify a CIR of [2, 1, . . . 1, 1], and a CQI of five (5). In alternate embodiments, a time domain CIR may be used. In yet other embodiments, channel quality parameters may be indirectly inferred from one or more other secondary calculations, such as Bit Error Rate (BER), Signal to Noise Ratio (SNR), etc. Moreover, the previously mentioned alternate representations of time, frequency, differential magnitudes, etc. can be similarly used in the foregoing calculations.

The first device determines a level of tolerance which inversely corresponds to the quality of the signal. For example, a received SNR of relatively good quality (high SNR) would correspond to a low level of tolerance. In contrast, a poor or low SNR would correspond to a high level of tolerance. This functionality may be implemented for example: (i) in a discrete fashion (e.g., an SNR above a certain prescribed threshold would qualify as "high", and therefore be subject to a first (reduced) tolerance value, whereas an SNR below the threshold would be subject to a second, more relaxed tolerance value); (ii) according to ranges (e.g., SNR in a first range gets a first (constant) tolerance value, in a second range a second tolerance value, and so forth); or (iii) in a substantially continuous fashion (e.g., the tolerance scales continuously in proportion to the determined SNR). Yet other schemes will be appreciated by those of ordinary skill given the present disclosure.

Moreover, it is appreciated that a level of tolerance may have a maximum and or minimum value associated therewith. For example, despite having a high SNR, a certain minimum level of tolerance may be required to robustly account for various sudden environmental changes (e.g., a multipath being partially occluded). In another example, despite having a low SNR, a certain maximum level of tolerance may be required so as to prevent overly encompassing tolerance.

In alternate variants, the coefficients of the CIR may undergo further modification to provide varying degrees of desirable weighting. For example, summing the square roots of the coefficients of the CIR reduces the impact of outlying coefficients (e.g., favoring multiple similar-strength multi-path channels), whereas summing the squares of the coefficients of the CIR increases the impact of peak coefficients (e.g., favoring channels having fewer high-power multipath channels). In the two scenarios of FIG. 12, a squaring scheme referenced above would yield a value of fifty-two (52) versus seven (7) (greatly accentuating the difference between the two channel gains). Alternatively, a square root scheme would yield approximately seven (7.14) versus approximately four (4.14) (minimizing the difference between the two channel gains).

Furthermore, for some implementations, there may be significant benefit to compressing both small and large values into a more compact range, or conversely spreading relatively close values further apart. Any function having the property of mapping an n range of inputs to an m range of outputs, where n and in differ, is suitable for such compression or expansion. For example, logarithmic algorithms greatly reduce large amplitude variations to a small numerical range (i.e., the linear range one (1) to one hundred (100) is expressed in the log range zero (0) to two (2)). Alternatively, exponential algorithms greatly increase large amplitude variations (i.e., the linear range zero (0) to two (2) is expressed in the base ten exponential range one (1) to one hundred (100)). Other such functions compatible with the present invention will be recognized by those of ordinary skill given the present disclosure.

In one exemplary embodiment, a level of tolerance is directly related to the channel quality indication. In the foregoing example of FIG. 12, the channel coefficients of the first requester indicate that its communication channel is significantly better than the second requester. Thus, a much lower level of tolerance (a less forgiving margin of error) may be used. The level of tolerance can be an absolute measurement, or alternatively a relative measurement, as best suited to the particular application.

FIG. 13 illustrates exemplary absolute 1300 and relative levels 1350 of quantization on the same CIR. An absolute level of quantization is measured from a reference point. Consider a first quantization point 1302 which has a clasping value at approximately five point six (5.6). The resultant quantized value would be six (6). However, the margin of tolerance in the upper and lower bounds are unevenly distributed. For example, at a later time, a decrease of even two tenths (0.2) would cause the resultant quantized value to round down to five (5) (5.6 minus 0.2=5.4, which rounds to 5), whereas significantly more margin (0.9) is available to the upper bound. In contrast, the relative level 1350 of tolerance is measured from the last known value, thus evenly distributing the margin between the upper and lower rounding thresholds. A relative level of tolerance behaves as an "envelope" to retain more consistent user identification.

The tolerance derived in step 806 indicates the likelihood of error in estimating the Channel Impulse Response. The noisier the channel, the more likely the CIR between the UE and the BS will differ. Thus, higher noise necessitates greater degrees of tolerance. For example, a high quality link between a UE and a BS will have a steady multipath signature. In contrast, a poor link between a UE and a BS will cause the UE and BS to measure different CIRs. The worse link quality will reflect in a wider variance in measured CIRs.

At step 808 of the method 800, the first device evaluates the determined channel characteristic result (user ID, encryption key, etc.) for accuracy based at least in part on the determined level of tolerance. In one embodiment, the first device compares an expected pseudonym to its detected pseudonym (from step 804), using the determined level of tolerance (from step 806). If the detected channel characteristic is within the range of tolerance, a successful result is generated. In other embodiments, if the detected channel characteristic is within the range of tolerance, both a successful result and an estimate of quality are generated.

The first device may also be configured to use the level of tolerance to correct a detected channel characteristic result blindly (i.e., without knowledge of an expected channel characteristic). In one such implementation, the detected pseudonym is corrected within the level of tolerance until the first device has successfully decoded a transmission. In one variant of this approach, the correction is performed blindly with "brute force" analysis. Brute-force analysis systematically enumerates all possible candidate pseudonyms within the level of tolerance and checks each of them. In one very simple example, a multipath having two (2) paths [3,3], and a level of tolerance of 1 (one) would require a search of the set: [2,2], [2,3], [2,4], [3,2], [3,3], [3,4], [4,2], [4,3], [4,4].

In other variants, the correction is performed using some initial "guess" criteria; e.g., based on some logical or heuristic criterion which the device either generates or has prior knowledge of Further embodiments of correctional action are described subsequently herein with respect to FIGS. 15 and 16.

Referring now to the exemplary implementation of FIG. 14, the result of the evaluation of step 808 is used in subsequent user identification. FIG. 14 illustrates one exemplary embodiment, having a first CIR based user ID 1402 transmitted from the second device (TX), and a second CIR based user ID 1404 received at the first device (RX). As shown, a difference in channel gains observed at the transmitter and the receiver leads to a discrepancy in user IDs; the difference is compensated for if it is within the level of tolerance.

In certain cases, the level of tolerance may vary over subsections of the entire channel impulse characteristic. For example, in an Orthogonal Frequency Division Multiple Access (OFDMA) scheme, various portions of the carrier band may be more heavily weighted than others. The in-band carriers have a substantially flatter RF response; accordingly, their channel characteristics are preferential and should have significantly tighter levels of tolerance. In one such variant, the out-of-band carriers may be evaluated with larger levels of tolerance.

The level of tolerance may also designate a maximum number of missing multipaths. For example, in some scenarios, multipaths may quickly fade in and out. Thus, matching a certain percentage (e.g., four out of five) multipaths may be sufficient, regardless of the entirely missing multipath. In one such variant, missing multipaths are completely disregarded in subsequent level of tolerance calculations (e.g., only four out of five paths are considered). In another such variant, missing multipaths are cumulatively detracted from subsequent level of tolerance calculations (e.g., all five of the paths are considered even though one may be missing).

In another embodiment, one or more channel characteristics are collectively regarded as an envelope. Referring back to FIG. 13, an "envelope" representation of channel characteristic profile may be useful for retaining a degree of consistency. Basic quantization may introduce rounding errors which falsely represent one or more profile peaks. An envelope may advantageously retain a more holistic view of a CIR. Hence, it is appreciated that the aforementioned variants may be equally useful with an enveloped embodiment, although this is by no means a requirement of practicing the invention.

In one implementation, when a comparison between the received channel characteristic 1404 and the transmitted channel characteristic 1402 is successful, one of the channel characteristics is selected as the resultant user identification (ID). The resultant channel characteristic may be directly used as user identification or pseudonym for service reception or provision. Alternatively, the resultant channel characteristic is indirectly used to derive a user identification (e.g., such as an input to a shared random number generator algorithm, etc.). The use and assignment of unique user IDs for consuming subscription-less data services is described in co-owned and co-pending U.S. Patent Application Serial No. 12/567,327 entitled "METHODS AND APPARATUS FOR DYNAMIC IDENTIFICATION (ID) ASSIGNMENT IN WIRELESS NETWORKS" previously referenced herein.

The resultant channel characteristic is, in one embodiment, the received channel impulse characteristic 1404. Alternatively, the resultant channel characteristic is the transmitted characteristic 1402 (i.e., the transmitted characteristic is extracted from the data transmission itself). The detected channel impulse characteristic 1404 may be useful for systems having some degree of expected change. For example, a device which is moving expects that its CIR will change; thus, the detected CIR is indicative of the most recent and most accurate CIR. In contrast, an expected channel characteristic 1402 is based on previous information and may be more useful for systems which do not expect significant change. For example, a base station to base station link (e.g., between femtocells, etc.) is generally sedentary or static; thus, changes to the CIR caused by momentary radio changes (e.g., an occluded path), are temporary. Similarly, selection between detected and expected channel characteristics may be based on the channel characteristics themselves. For example, a receiver that has momentarily poor coverage may adopt the expected channel characteristic, rather than trust its detected channel characteristic. Similarly, a receiver that has good coverage may adopt its detected channel characteristic, rather than the expected channel characteristic. Other selection criteria are recognized by those skilled in the arts.

Additional Correction Methods—

Recall in the prior discussion of step 808 of FIG. 8 that the first device may in some circumstances be required to correct a detected channel characteristic result blindly (i.e., without knowledge of the second device's channel characteristic). In one such variant, the first device performs a number of guesses of the unknown channel characteristic, based on its detected channel characteristic, and its level of tolerance. For example, the first device may receive a message from the second device, where the second device uses the expected channel characteristic to derive a key. The first device must determine the key without knowledge of the channel characteristic used by the second device. Prior art solutions (such as the aforementioned United States Patent Application 20080075280 to Ye Chunxuan, et al. filed Mar. 27, 2008 and entitled "GROUP-WISE SECRET KEY GENERATION") are extraordinarily sensitive to noise, and are not feasibly implemented in noisy transmission channels. "Brute force" guessing of an infinite number of possible channel characteristics is in most cases less advantageous, since such techniques are both time and resource-intensive. However, it will be appreciated that if the first device is advantageously already "in the ballpark" (i.e., the first device can expect any errors to be "small"), then the process is greatly simplified. For example, if a difference exists, it is expected to vary by only an incremental amount (e.g., +/−1 in any one or more of the peaks, etc.).

FIG. 15 illustrates one embodiment of the invention, having a first CIR based encryption key 1502 transmitted from the second device (TX), and a second CIR based encryption key 1504 received at the first device (RX). As shown, a difference in channel gains observed at the transmitter and the receiver leads to a discrepancy in encryption keys; unlike the system of FIG. 14, an encryption key must be corrected for (i.e., the receiver and transmitter must agree on the same key).

Figure 16:
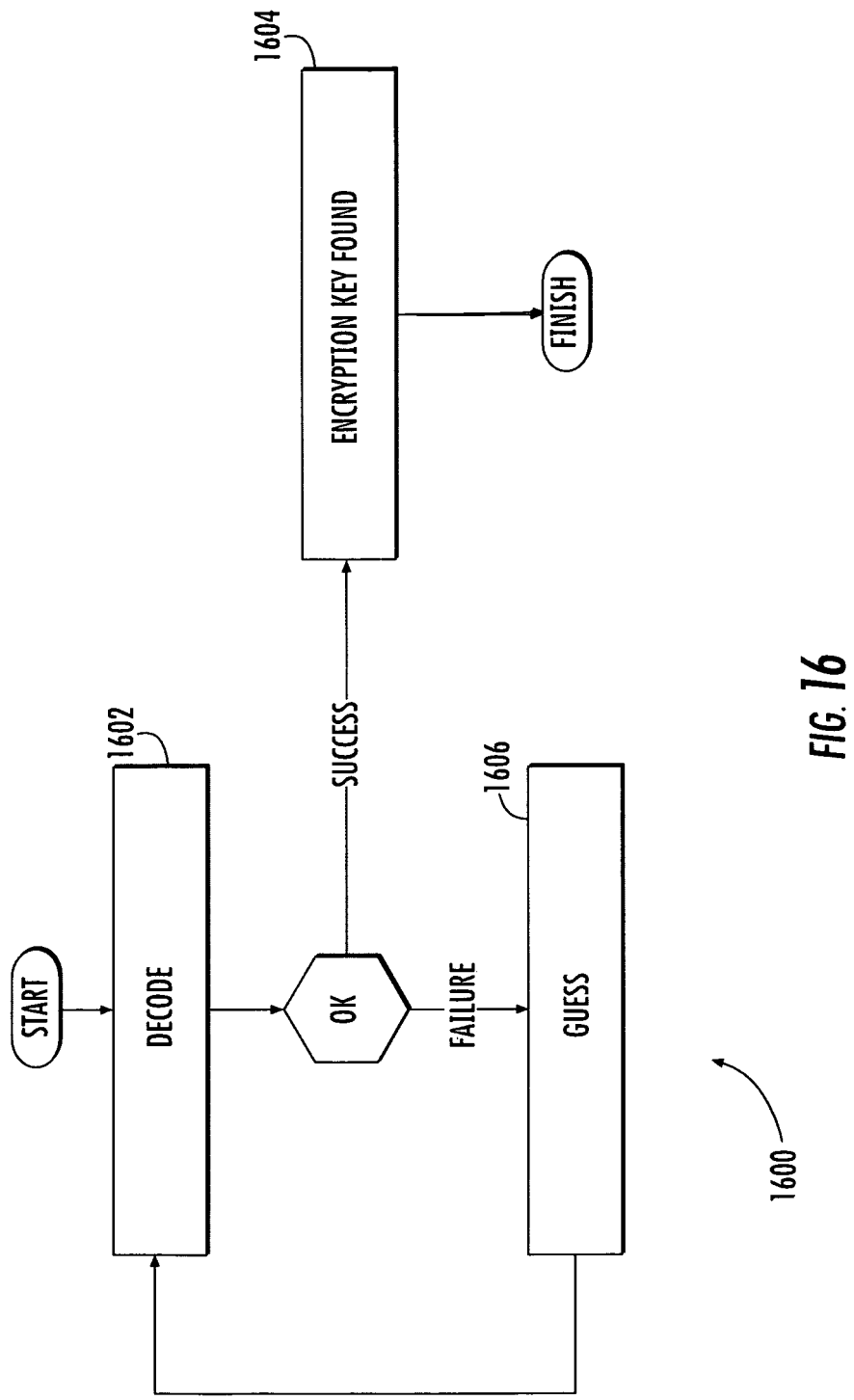
FIG. 16 is a logical flow diagram of an exemplary embodiment of the generalized process for correcting a corrupted encryption key, in accordance with the present invention.

FIG. 16 illustrates one embodiment of the generalized method for encryption key "guessing" 1600 in accordance with the present invention. At step 1602, the first device tries to decode the encrypted data based on the original encryption key estimates 1504. If the decoding succeeds then the encryption key has been successfully found (1604), and the process 1600 is stopped.

If a decode error occurs, than at step 1606, one or more elements of the encryption key are evaluated further, such as via "guessing". In one exemplary embodiment, this guessing includes variation of the first element; e.g., decrementing (e.g., decreasing by "−1") the first element, and attempting the decoding again. If the decoding succeeds, the process 1600 is stopped. If the decoding fails, the first element of the encryption key is incremented (e.g., increased by "+1") over its original value, and the decoding is attempted again. If the decoding succeeds, the process 1600 is stopped. The steps for guessing 1606 and decoding 1602 are repeated for each path, and/or combination of paths, until the message is correctly decoded, or the process is aborted based on other criteria (e.g., too many attempts, time out, etc.).

In one embodiment, information about the multipath is used to further narrow guessing. Higher received signal peaks generally correlate to better reception; thus, higher peaks are generally more accurate. Thus, in one variant, significantly more time is devoted to analysis of lower signal peaks. Alternatively, lower signal peaks may be completely disregarded (by both transmitting and receiving devices).

In one embodiment, derivation of the encryption key is based on the number of multipaths and/or consideration of the number of presently supported users. In high density cases, (i.e., where the number of users outnumbers the number of multipaths), the encryption key generator may use an expansion function, whereby even a relatively small number of multipaths can be expanded into a larger number of encryption keys. Thus, the encryption key complexity would not be compromised, even though the receiver need only adjust for a small number of multipaths (for example, its three (3) strongest multipaths). Common examples of such expansion functions include pseudo-random number generators, linear feedback shift registers, etc.

In contrast, low density cases (i.e., where the number of users is significantly less than the number of multipaths) may use a reducing function, such as a common "hashing" scheme. Hashing functions (such as for example those disclosed in "The Art of Computer Programming" Volume 3, $2^{nd}$ Edition authored by Donald E. Knuth, incorporated herein by reference in its entirety) may be used with a large number of multipath characteristics to generate a smaller index.

Furthermore, in some implementations, a base station may need to compensate for a population of users, some of which have only a few multipaths and some having many multipaths. In such cases, a combination of the expansion and reducing functions may be used to ensure that all users are using approximately equivalently sized encryption keys, Exemplary Apparatus—

Figure 17:
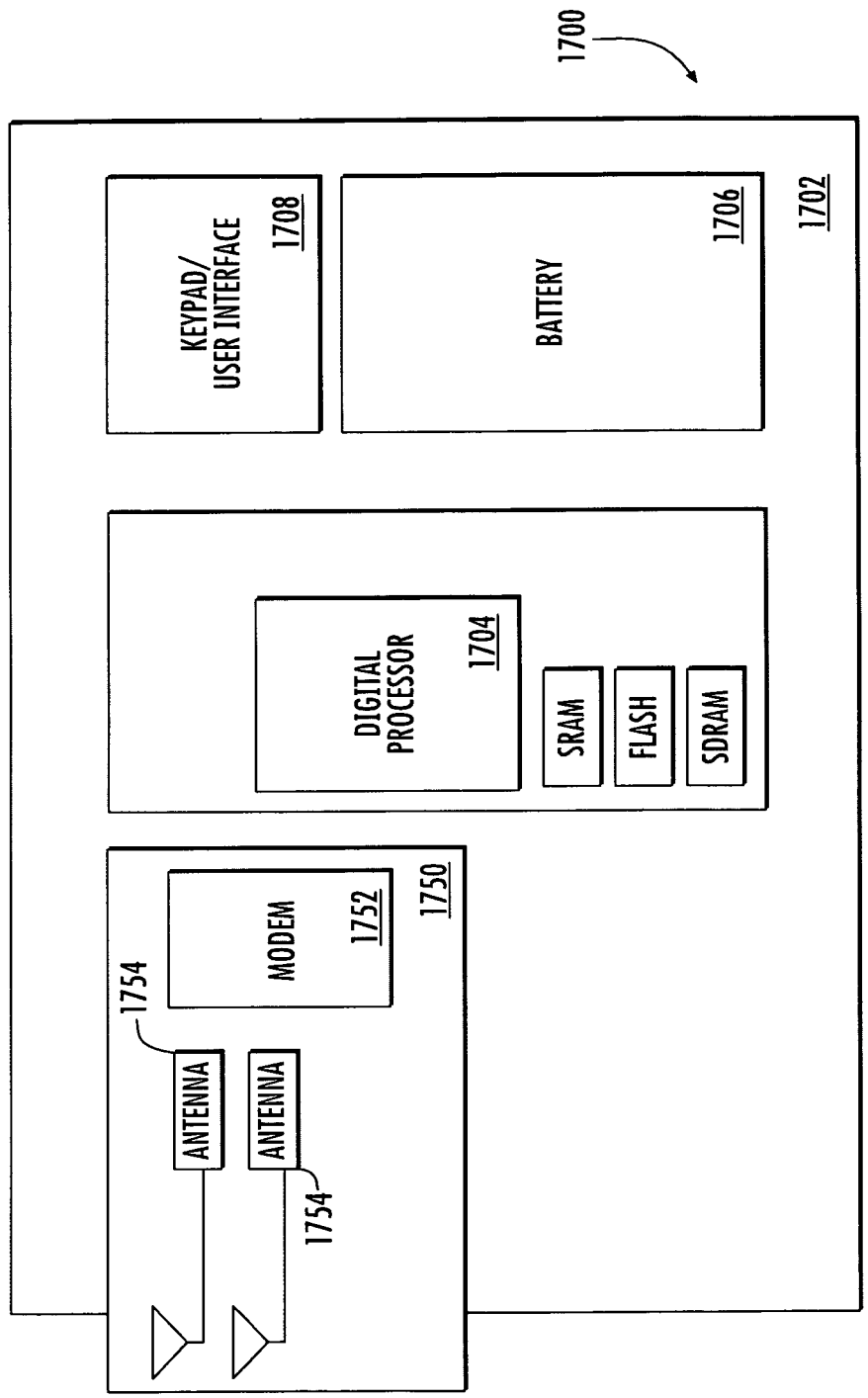
FIG. 17 is a block diagram of one embodiment of a generalized apparatus configured in accordance with the present invention.

Referring now to FIG. 17, one exemplary embodiment of an apparatus 1700 useful in implementing the methods of the present invention is illustrated. The detection and compensation for radio channels described above are preferably performed in software, although hardware/firmware embodiments are also envisioned.

The exemplary UE apparatus includes one or more substrate(s) 1702 that further include a plurality of integrated circuits (ICs) including a processing subsystem 1704 such as a digital signal processor (DSP), microprocessor, programmable logic device (PLD), gate array, or plurality of processing components, as well as a power management subsystem 1706 that provides power to the apparatus 1700, a user interface (UI) subsystem 1708, and a radio subsystem 1750. As used herein, the term "integrated circuit" refers to any type of device having any level of integration (including without limitation ULSI, VLSI, and LSI) and irrespective of process or base materials (including, without limitation Si, SiGe, CMOS and GaAs).

The processing subsystem may also comprise an internal cache memory. The processing subsystem 1704 is connected to a memory subsystem comprising memory which may for example, comprise SRAM, Flash and SDRAM components. The memory subsystem may implement one or a more of DMA type hardware, so as to facilitate data accesses as is well known in the art.

The illustrated power management subsystem (PMS) 1706 provides power to the apparatus, and may include an integrated circuit and or a plurality of discrete electrical components. In one exemplary portable implementation of the apparatus 1700, the power management subsystem 1706 interfaces with a rechargeable battery power source within the apparatus.

The user interface subsystem 1708 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card type UE embodiments may lack a user interface (as they could piggyback onto the user interface of the host device to which they are physically and/or electrically coupled).

The apparatus 1700 may further include optional additional peripherals including, without limitation, one or more GPS transceivers, or network interfaces such as IrDA ports, Bluetooth transceivers, USB, FireWire™, WiMAX transceivers, etc. It is however appreciated that these components are not required for operation of the apparatus in accordance with the principles of the present invention.

The radio subsystem 1750 includes one or more RF front-ends 1752, and a plurality of decoding resources 1754. The RF front-ends 1752 of the illustrated embodiment generally include the antennas and any analog stages used to convert a received radio signal to a digital signal. A RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, RF front-ends are generally adapted to a very limited range of operation.

In some instances, multiple RF front-ends 1752 may be required for different radio frequencies, and or radio access technologies (RATs). For example, in the illustrated embodiment, the apparatus has two (2) RF front-ends. It is readily appreciated that in some embodiments, the RF front-ends may support any combination of MIMO (Multiple Input Multiple Output), SIMO (Single Input Multiple Output), MISO (Multiple Input Single Output), and SISO (Single Input Single Output) antennas.

The plurality of decoding resources 1754 of the illustrated embodiment includes apparatus adapted to decode received data. Generally, decoding resources may include such elements as processing elements, application specific circuitry, and or other common communication elements, such as Fast Fourier Transforms (FFT) processing, Multiply Accumulate (MAC) logic, arithmetic logic units (ALU), floating point logic, etc. In one specific embodiment, the decoding resources are configurable FFT-based computational resources, adapted for decoding subcarriers of an Orthogonal Frequency Division Multiple Access/Time Division Multiple Access (OFDMA/TDMA) modulation scheme. Such FFT resources are flexibly programmed at subframe time intervals to decode any subset of a plurality of the subcarriers which populate the entire carrier bandwidth. The subdivision of time (i.e., subframes) and frequency (i.e., subcarriers) can be viewed as a "grid" of decoding resources.

In multimode systems, multiple types of RF front-ends 1752 and decoding resources 1754 may be intermixed, and or interchanged. In some cases, the functionality of one or more components may be performed by a single component. The numerous possible combinations of the various RF front-ends and decoding resources are readily appreciated by those of ordinary skill in the art given the present disclosure.

In one exemplary embodiment of the present invention, the radio subsystem is specifically adapted to derive a first user identification (ID) from one or more detected channel characteristics and at least one degree or level of tolerance or other acceptance criterion. The first user identification is compared to a second user identification using the degree or level of tolerance. In one variant, the second user identification is encapsulated within a message containing data content. Other exemplary variants are detailed in co-owned, co-pending U.S. patent application Ser. No. 12/567,327 entitled "METHODS AND APPARATUS FOR DYNAMIC IDENTIFICATION (ID) ASSIGNMENT IN WIRELESS NETWORKS" previously incorporated herein.

In one alternate embodiment of the present invention, the radio subsystem is specifically adapted to derive a first encryption key from one or more detected channel characteristics, and at least one degree or level of tolerance or other acceptance criterion. The encryption key is used to decode a data transmission within the degree or level of tolerance. In one variant, failed attempts to decode the data transmission are re-attempted with minor modification to the encryption key until either the decoding is successful, or a certain criterion has been met (e.g., too many attempts, too great of a degree of modification of the original key, etc.).

Business Methods and Rules Engine—

It will be recognized that the foregoing network access control apparatus and methodologies may be readily adapted to various business models. For example, in one such model, a service provider/network operator may provide a subscription-less data services to customers willing to pay a premium, as an incentive for its higher-tier customers, or even subsidized by other $3^{rd}$ parties. Thus, a network operator may offer sponsored broadcasts, or multicasts of e.g., advertisements, user incentives, etc.

In another business model, a cellular network operator may provide movies or short videos intermixed with commercial material, the latter being optionally tailored to the content of the former (e.g., auto advertisements for a video or movie relating to car racing).

In yet another model, a cellular network operator may provide free multicast services tailored to different UE classes. For instance, all UEs with a high data rate may be grouped within a first class, and lower data rate UEs may be grouped within a second class. An "identical" service may be provided to both first and second class UEs, where the UEs of the second class actually receive lower data rate (e.g., transcoded or transrated, HD versus SD, etc.) versions of the service provided to UEs of the first class, or alternatively the first class receives up-converted versions of the lower rate content sent to the second class.

In another model, unicast service (point-to-point) may be provided by the network operator e.g., sponsored by commercials, etc.

Furthermore, it is readily recognized that the degree of tolerance allowed by the base station for user identification or encryption key detection is directly related to various desirable qualities for the subscriber. For example, an extraordinarily lenient system for user identification (e.g., large levels of tolerance), could conceivably be less secure. Similarly, a strict system for user identification is considerably more burdensome for all parties involved, and may be considerably less robust. In another such example, the number of unique user IDs is a direct function of the complexity of the degree of tolerance. If the system has a higher tolerance for error, then the system must necessarily support fewer user identities.

Consequently, the aforementioned network apparatus and methodologies may also be readily adapted for operation in accordance with an underlying business rules "engine". This business rules engine may comprise for example a software application and/or hardware. In one embodiment, the business rules engine takes into account the revenue and/or profit implications associated with providing greater and lesser degrees of subscription-less data access to known or unknown users via one or more base stations. For example, a small business owner such as a coffee shop may find that customers prefer receiving individually tailored service provisioning, with high degrees of anonymity. However, it may be in the coffee shops interest to quickly provide subscription-less data for advertisements and coupons for people passing by. Accordingly, the exemplary business rules engine can modify the behavior of the system at specific steps described in the methodologies above in order to accomplish one or more economic objectives for the network operator. These "business rules" may be imposed e.g., at time of resource request and then maintained for a period of time (or until an event triggering a re-evaluation occurs), or alternatively according to a periodic model. Myriad different schemes for implementing dynamic allocation of resources will be recognized by those of ordinary skill given the present disclosure.

Moreover, all or a portion of the foregoing analyses for business rules can be performed at the base station itself if so configured, such as via a client portion of distributed application (DA) in communication with a parent or "server" portion.

Yet also, it is recognized that the assignment of a user ID is ultimately controlled by the network operator. Therefore, in certain business models, a user ID may be assigned for certain services preferentially. For example, a coffee shop BS may be reluctant to hand out user IDs for high data rate requests, but readily provide user IDs for menu requests, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of compensating for differences between an unknown encryption key and a detected encryption key, the method comprising:
   detecting an encryption key based at least in part on one or more quantized radio channel characteristics;
   determining a level of tolerance, the level of tolerance based at least in part on one or more estimations of noise;
   decrypting a data transmission with a processor using the detected encryption key; and
   when the decryption of the data transmission is not successful:
   modifying the detected encryption key with the processor within the level of tolerance; and
   decrypting the data transmission with the processor using the modified detected key;
   wherein the modifying of the detected encryption key with the processor further compiles guessing of the radio channel characteristic within the level of tolerance; and
   wherein the guessing office radio channel characteristic does not require bit-exact operation.

2. The method of claim 1, wherein the quantizing is performed according to a fixed degree of quantization.

3. The method of claim 1, wherein the quantizing is performed according to a configurable degree of quantization.

4. The method of claim 1, wherein the one or more radio channel characteristics comprises a channel impulse response (CIR).

5. The method of claim 4, wherein the CIR comprises a time domain representation of received signal magnitude.

6. The method of claim 4, wherein the CIR comprises a frequency domain representation of received signal magnitude.

7. The method of claim 4, wherein the level of tolerance is based at least in part on one or more estimations of noise, the one or more estimations of noise comprising a summation of one or more values, the one or more values derived from the CIR.

8. The method of claim 1, wherein the detected encryption key is based at least in part on one or more detection parameters.

9. The method of claim 8, wherein the one or more detection parameters are broadcast.

10. The method of claim 8, wherein the one or more detection parameters are predefined.

11. The method of claim 1, wherein the one or more estimations of noise comprise signal-to-noise ratio (SNR) determinations.

12. The method of claim 11, wherein the level of tolerance is inversely proportional to the SNR determinations.

13. The method of claim 1, wherein the level of tolerance is inversely proportional to the summation of one or more values.

14. The method of claim 1, wherein the modifying comprises incrementing or decrementing one or more values of the detected key within the level of tolerance.

15. The method of claim 1, wherein the steps of modifying the detected key within the level of tolerance and decrypting the data transmission using the modified detected key are repeated until the decrypted data transmission is successful.

16. A wireless apparatus adapted to compensate for differences between two encryption keys, at least one of which is not known, the wireless apparatus comprising:
   a first module configured to detect a first encryption key;
   a second module configured to determine a level of tolerance, the level of tolerance based at least in part on one or more estimations of noise;
   a third module configured to receive a data transmission associated with an unknown second encryption key;
   a processing device in data communication with a memory; and
   a plurality of executable instructions resident within the memory that, when executed by the processing device:
   decrypt the data transmission using the detected first encryption key; and
   when the decrypted data transmission is not successful:
   modify the detected first encryption key within the level of tolerance without any supporting message exchange; and
   decrypt the data transmission using the modified detected first encryption key.

17. The wireless apparatus of claim 16, wherein the wireless apparatus comprises a mobile user device adapted for communication with a WLAN network.

18. The wireless apparatus of claim 17, wherein the wireless apparatus comprises a base station or access point (AP).

19. The wireless apparatus of claim 16, where the first module is further configured to quantize one or more radio channel characteristics.

20. The wireless apparatus of claim 19, where the detected first encryption key is based at least in part the on one or more quantized radio channel characteristics.

21. The wireless apparatus of claim 19, where the quantization is performed according to a fixed degree of quantization.

22. The wireless apparatus of claim 19, where the quantization is performed according to a configurable degree of quantization.

23. The wireless apparatus of claim 19, where the one or more radio channel characteristics comprises a channel impulse response (CIR).

24. The wireless apparatus of claim 23, where the CIR comprises a time domain representation of received signal magnitude.

25. The wireless apparatus of claim 23, where the CIR comprises a frequency domain representation of received signal magnitude.

26. The wireless apparatus of claim 16, where the detection of the detected first encryption key is based at least in part on one or more detection parameters.

27. The wireless apparatus of claim 26, where the one or more detection parameters are broadcast.

28. The wireless apparatus of claim 26, where the one or more detection parameters are predefined.

29. The wireless apparatus of claim 16, where the one or more estimations of noise comprise signal-to-noise ratio (SNR) determinations.

30. The wireless apparatus of claim 29, where the level of tolerance is inversely proportional to the SNR determinations.

31. The wireless apparatus of claim 29, where the level of tolerance is inversely proportional to a summation of one or more channel impulse response (CIR) values.

32. The wireless apparatus of claim 16, where the plurality of executable instructions resident within the memory further comprises logic configured to increment or decrement one or more values of the detected first encryption key within the level of tolerance.

33. The wireless apparatus of claim 16, where the plurality of executable instructions resident within the memory for (i) modification of the detected first encryption key within the level of tolerance and (ii) decryption of the data transmission using the modified detected first encryption key, are further configured to repeat until the decrypted data transmission is successful.

34. A server apparatus adapted to transmit a data transmission with an encryption key, where the encryption key is not provided to a receiver device, the server apparatus comprising:
- a first module configured to receive a request for a data service;
- a second module configured to encrypt and transmit a data transmission with a first encryption key, the data transmission associated with the requested data service;
- a third module configured to broadcast one or more detection parameters;
- where the receiver device is further configured to:
- detect a second key based on the broadcasted one or more detection parameters;
- determine a level of tolerance, the level of tolerance based at least in part on one or more estimations of noise;
- adjust the detected second key based on the level of tolerance; and
- decrypt the data transmission using the adjusted second key.

35. The server apparatus of claim 34, where the first module is further configured to quantize one or more radio channel characteristics associated with the received request.

36. The server apparatus of claim 35, where the first encryption key is generated based at least in part the on one or more quantized radio channel characteristics.

37. The server apparatus of claim 36, where the quantization is performed according to a fixed degree of quantization.

38. The server apparatus of claim 36, where the quantization is performed according to a configurable degree of quantization.

39. The server apparatus of claim 38, where the one or more detection parameters comprises the configurable degree of quantization.

40. The server apparatus of claim 35, where the one or more detection parameters comprises an indication that the first encryption key is based on a time domain representation of the quantized one or more radio channel characteristics.

41. The server apparatus of claim 35, where the one or more detection parameters comprises an indicator that the first encryption key is based on a frequency domain representation of the quantized one or more radio channel characteristics.

42. The server apparatus of claim 34, where the one or more detection parameters comprises a system information block (SIB).

43. The server apparatus of claim 42, where the SIB is only transmitted at specific radio frames.

44. A method for transmitting a data transmission with an encryption key, where the encryption key is not provided to a receiver device, the method comprising:
- receiving a request for a data service via a wireless transceiver;
- generating a first encryption key based at least in part on one or more quantized radio channel characteristics associated with the received request;
- encrypting a data transmission with the first encryption key at a processor, the data transmission associated with the requested data service;
- transmitting the data transmission via the wireless transceiver;
- broadcasting one or more detection parameters;
- where responsive to receiving the encrypted data transmission the receiver device:
- detects a second key based on the broadcasted one or more detection parameters;
- determines a level of tolerance, the level of tolerance based at least in part on one or more estimations of noise;
- adjusts the detected second key based on the level of tolerance; and
- decrypts the data transmission using the adjusted second key.

45. The server apparatus of claim 44, where the first encryption key is generated from a time domain representation of the one or more quantized radio channel characteristics.

46. The server apparatus of claim 44, where the first encryption key is generated from a frequency domain representation of the one or more quantized radio channel characteristics.

47. The server apparatus of claim 44, where the one or more quantized radio channel characteristics are bare a fixed degree of quantization.

48. The server apparatus of claim 44, where the one or more quantized radio channel characteristics are have a configurable degree of quantization.

49. The server apparatus of claim 44, where the request for the data services is anonymous.

* * * * *